United States Patent
Liu et al.

(10) Patent No.: US 11,704,927 B2
(45) Date of Patent: Jul. 18, 2023

(54) ULTRASONIC FINGERPRINT SENSOR APPARATUS, DISPLAY DEVICE, METHOD OF DETECTING FINGERPRINT INFORMATION, AND METHOD OF FABRICATING ULTRASONIC FINGERPRINT SENSOR APPARATUS

(71) Applicant: BOE Technology Group Co., Ltd., Beijing (CN)

(72) Inventors: Yingming Liu, Beijing (CN); Haisheng Wang, Beijing (CN); Xiaoliang Ding, Beijing (CN); Pengpeng Wang, Beijing (CN); Xiufeng Li, Beijing (CN); Chenyang Zhang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 432 days.

(21) Appl. No.: 16/970,928

(22) PCT Filed: Nov. 14, 2019

(86) PCT No.: PCT/CN2019/118508
§ 371 (c)(1),
(2) Date: Aug. 18, 2020

(87) PCT Pub. No.: WO2021/092851
PCT Pub. Date: May 20, 2021

(65) Prior Publication Data
US 2023/0095588 A1     Mar. 30, 2023

(51) Int. Cl.
*G06V 40/13*     (2022.01)
*G06F 3/044*     (2006.01)
*G06F 3/043*     (2006.01)

(52) U.S. Cl.
CPC ........ *G06V 40/1306* (2022.01); *G06F 3/0433* (2013.01); *G06F 3/0445* (2019.05); *G06F 3/0446* (2019.05); *G06F 2203/04103* (2013.01)

(58) Field of Classification Search
CPC ...... G06F 3/041–047; G06F 2203/041–04114; G06F 3/0433;
(Continued)

(56) References Cited

U.S. PATENT DOCUMENTS 11,328,527 B2 *   5/2022   Gu .................... G06V 40/1306
2016/0107194 A1    4/2016   Panchawagh et al.
(Continued)

FOREIGN PATENT DOCUMENTS

CN     106782085 A    5/2017
CN     107194384 A    9/2017
(Continued)

OTHER PUBLICATIONS

International Search Report & Written Opinion dated Aug. 12, 2020, regarding PCT/CN2019/118508.
(Continued)

*Primary Examiner* — Sanjiv D. Patel
(74) *Attorney, Agent, or Firm* — Intellectual Valley Law, P.C.

(57) ABSTRACT

An ultrasonic fingerprint sensor apparatus is provided. The ultrasonic fingerprint sensor apparatus includes a base substrate; a first electrode layer on the base substrate, and including an array of a plurality of first electrodes spaced apart from each other by an inter-electrode region; a piezoelectric layer on a side of the first electrode layer away from the base substrate; a second electrode layer on a side of the piezoelectric layer away from the base substrate, and including one or more second electrodes; and a first reference electrode layer configured to provide a first reference volt-
(Continued)

age. An orthographic projection of the first electrode layer on the base substrate is substantially non-overlapping with an orthographic projection of the second electrode layer on the base substrate. The first electrode layer and the first reference electrode layer are between the base substrate and the piezoelectric layer.

18 Claims, 17 Drawing Sheets

(58) Field of Classification Search
CPC ...... G06F 3/043; G06F 3/0436; G06F 3/0412; H01L 27/323; G06V 40/1306; G06V 40/12; G06V 40/13
See application file for complete search history.

(56) References Cited

U.S. PATENT DOCUMENTS

| | | |
|---|---|---|
| 2018/0068146 A1 | 3/2018 | Bai |
| 2019/0205591 A1* | 7/2019 | Ban ................... H01L 41/1132 |
| 2019/0251378 A1* | 8/2019 | Jung ................... B06B 1/0629 |
| 2020/0242316 A1 | 7/2020 | Liu et al. |
| 2021/0064213 A1 | 3/2021 | Yang et al. |
| 2021/0334493 A1 | 10/2021 | Tang et al. |

FOREIGN PATENT DOCUMENTS

| | | |
|---|---|---|
| CN | 108446685 A | 8/2018 |
| CN | 109346507 A | 2/2019 |
| CN | 109614963 A | 4/2019 |
| CN | 109815918 A | 5/2019 |
| CN | 110163070 A | 8/2019 |
| CN | 110175586 A | 8/2019 |

OTHER PUBLICATIONS

First Office Action in the Chinese Patent Application No. 201980002443.5, dated Apr. 11, 2023; English translation attached.

* cited by examiner

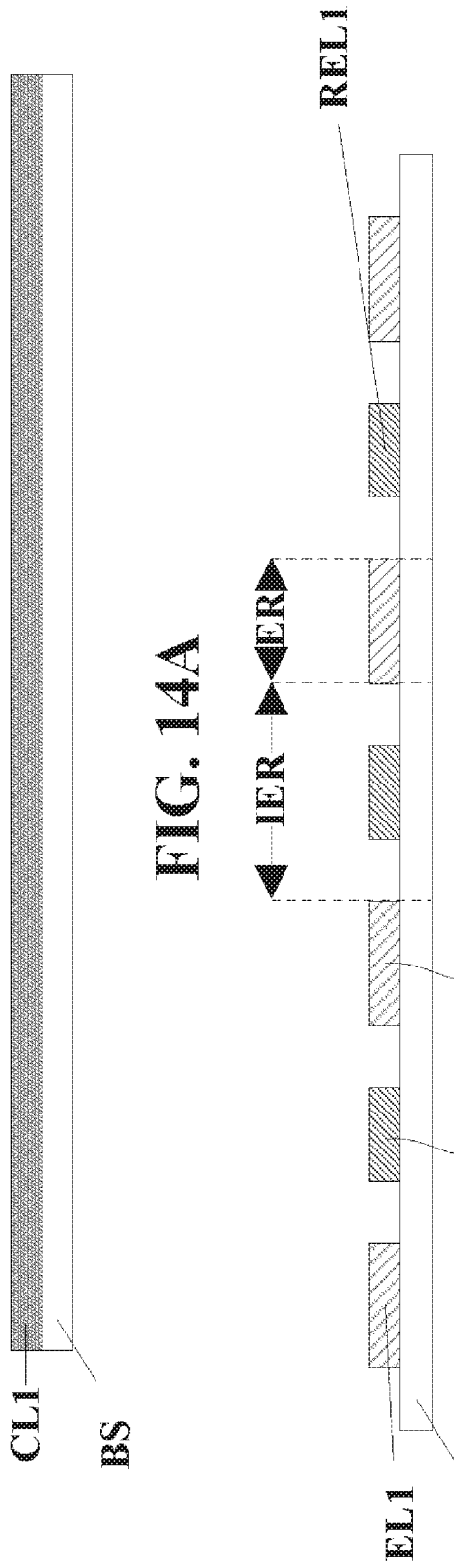
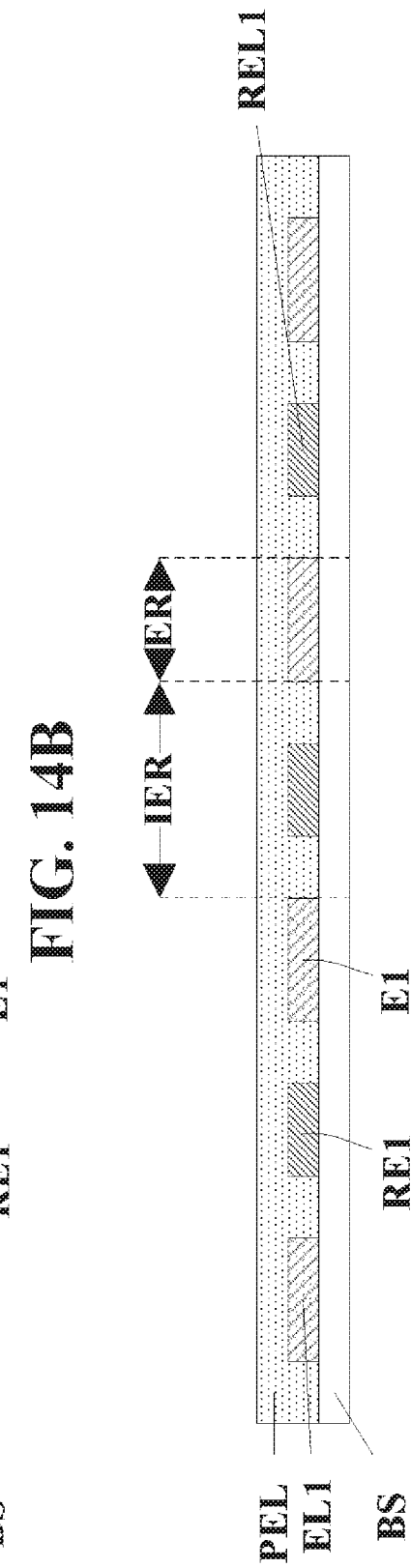

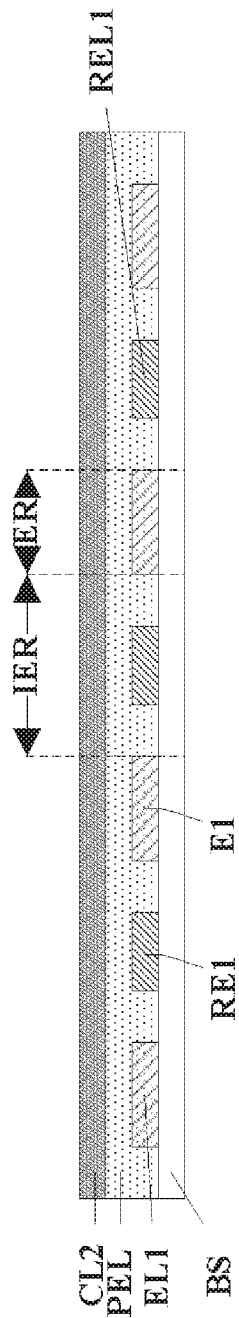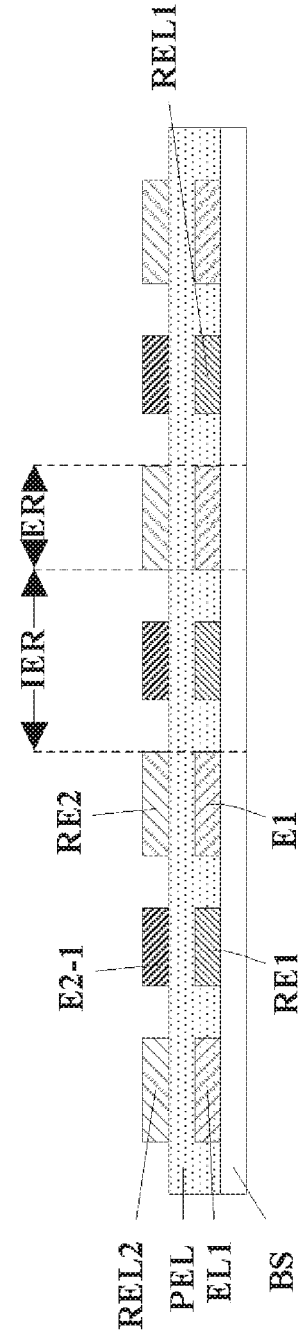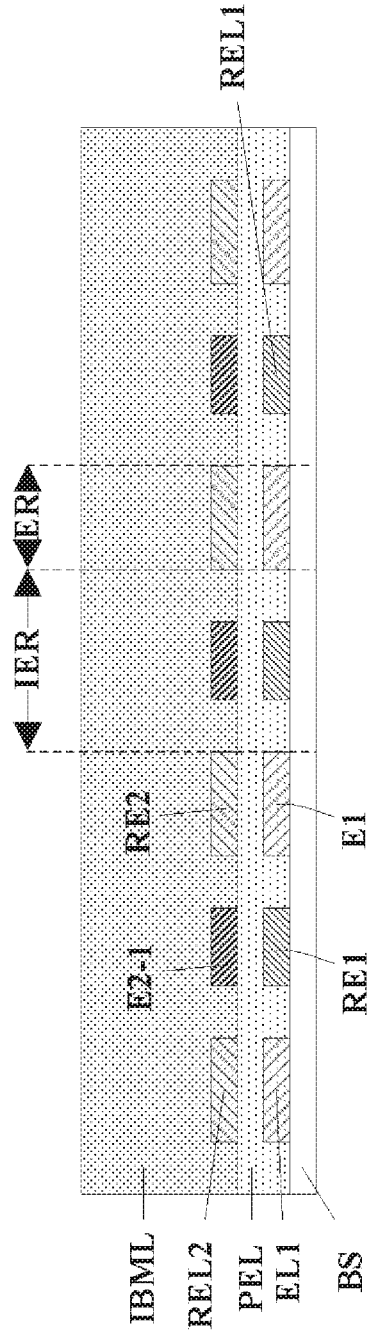

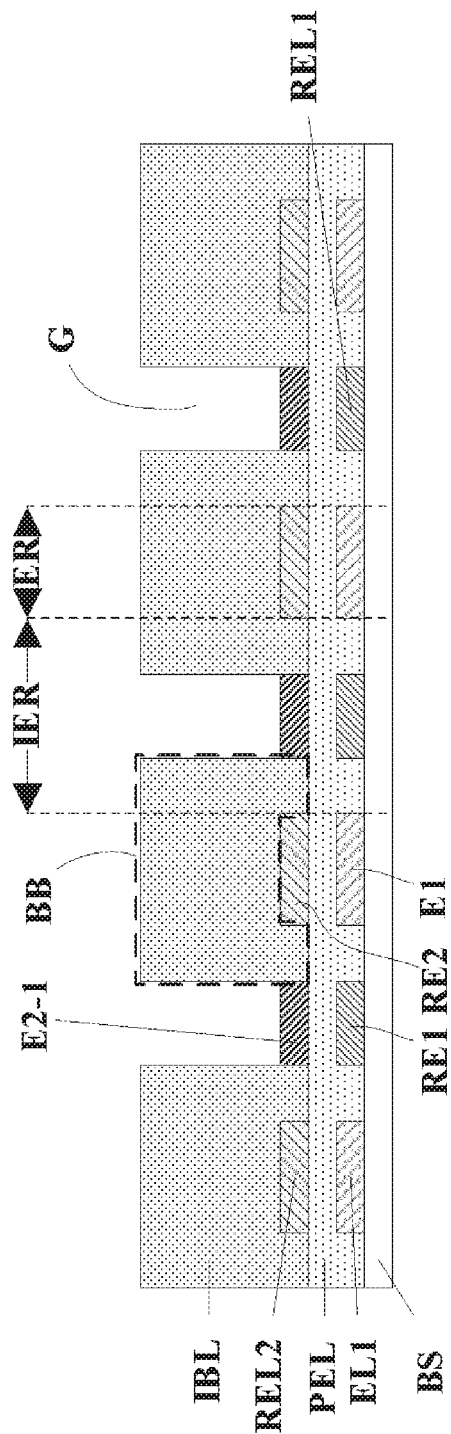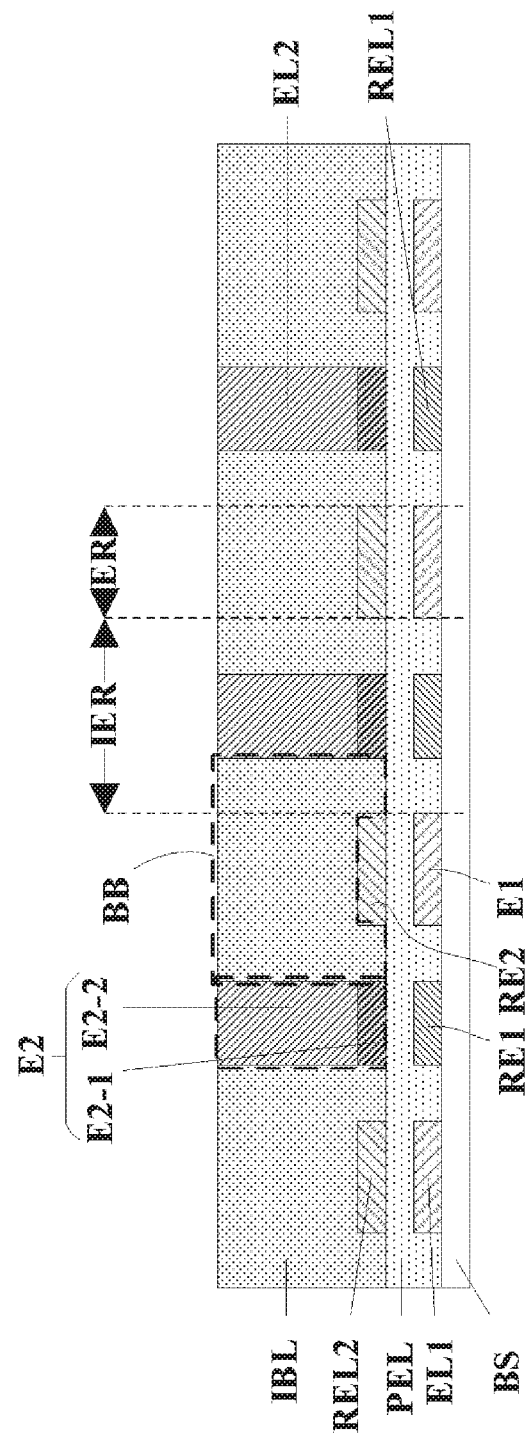

ULTRASONIC FINGERPRINT SENSOR APPARATUS, DISPLAY DEVICE, METHOD OF DETECTING FINGERPRINT INFORMATION, AND METHOD OF FABRICATING ULTRASONIC FINGERPRINT SENSOR APPARATUS

CROSS-REFERENCE TO RELATED APPLICATION

This application is a national stage application under 35 U.S.C. § 371 of International Application No. PCT/CN2019/118508, filed Nov. 14, 2019, the contents of which are incorporated by reference in the entirety.

TECHNICAL FIELD

The present disclosure relates to biometric detection technology, more particularly, to an ultrasonic fingerprint sensor apparatus, a display device, a method of detecting fingerprint information, and a method of fabricating an ultrasonic fingerprint sensor apparatus.

BACKGROUND

Fingerprint recognition technology has been widely used in many fields, such as mobile phones, tablets, televisions, and security protection systems. Various techniques have been used to implement fingerprint recognition, including optical, capacitive and ultrasonic imaging technologies. Ultrasonic fingerprint sensors have many advantages such as its three-dimensional capability, protection with a higher security level, enhanced user experience, better design, and a relative low cost.

SUMMARY

In one aspect, the present disclosure provides an ultrasonic fingerprint sensor apparatus, comprising a base substrate; a first electrode layer on the base substrate, and comprising an array of a plurality of first electrodes spaced apart from each other by an inter-electrode region; a piezoelectric layer on a side of the first electrode layer away from the base substrate; a second electrode layer on a side of the piezoelectric layer away from the base substrate, and comprising one or more second electrodes; and a first reference electrode layer configured to provide a first reference voltage; wherein an orthographic projection of the first electrode layer on the base substrate is substantially non-overlapping with an orthographic projection of the second electrode layer on the base substrate; the first electrode layer and the first reference electrode layer are between the base substrate and the piezoelectric layer.

Optionally, the ultrasonic fingerprint sensor apparatus further comprises an insulating barrier layer on a side of the piezoelectric layer away from the base substrate; wherein the insulating barrier layer comprises a plurality of barrier blocks; an orthographic projection of a respective one of the plurality of barrier blocks on the base substrate is substantially non-overlapping with the orthographic projection of the second electrode layer on the base substrate; and an orthographic projection of a respective one of the plurality of barrier blocks on the base substrate at least partially overlaps with an orthographic projection of a respective one of the plurality of first electrodes on the base substrate.

Optionally, the second electrode layer and the insulating barrier layer are both in direct contact with the piezoelectric layer.

Optionally, the first reference electrode layer is in the inter-electrode region and spaced apart from the plurality of first electrodes; and an orthographic projection of the first reference electrode layer on the base substrate at least partially overlaps with an orthographic projection of a respective one of the one or more second electrodes on the base substrate.

Optionally, the first reference electrode layer and the first electrode layer are both in direct contact with the piezoelectric layer.

Optionally, the ultrasonic fingerprint sensor apparatus further comprises a second reference electrode layer configured to provide a second reference voltage; wherein an orthographic projection of the second reference electrode layer on the base substrate at least partially overlaps with an orthographic projection of a respective one of the plurality of first electrodes on the base substrate.

Optionally, the second reference electrode layer comprises a plurality of second reference electrodes; an orthographic projection of a respective one of the plurality of second reference electrodes on the base substrate at least partially overlaps with an orthographic projection of a respective one of the plurality of first electrodes on the base substrate.

Optionally, the ultrasonic fingerprint sensor apparatus further comprises an insulating barrier layer on a side of the piezoelectric layer away from the base substrate; wherein the insulating barrier layer comprises a plurality of barrier blocks; an orthographic projection of a respective one of the plurality of barrier blocks on the base substrate is substantially non-overlapping with the orthographic projection of the second electrode layer on the base substrate; and the orthographic projection of the respective one of the plurality of barrier blocks on the base substrate at least partially overlaps with an orthographic projection of a respective one of the plurality of first electrodes on the base substrate, and covers the orthographic projection of a respective one of the plurality of second reference electrodes on the base substrate.

Optionally, a respective one of the one or more second electrodes comprises a first conductive sub-layer in direct contact with the piezoelectric layer and a second conductive sub-layer on a side of the first conductive sub-layer away from the piezoelectric layer; the first conductive sub-layer and the plurality of second reference electrodes are in a same layer and comprise a same conductive material; the first conductive sub-layer and the plurality of second reference electrodes have a substantially same thickness along thickness direction from the base substrate to the second electrode layer; the first conductive sub-layer and the plurality of second reference electrodes are in direct contact with the piezoelectric layer; and the respective one of the plurality of barrier blocks spaces apart the respective one of the plurality of second reference electrodes from the one or more second electrodes.

Optionally, the second reference electrode layer is on a side of the second electrode layer away from the base substrate; and the ultrasonic fingerprint sensor apparatus further comprises an insulating layer between the second electrode layer and the second reference electrode layer.

Optionally, a respective one of the one or more second electrodes comprises a first conductive sub-layer in direct contact with the piezoelectric layer and a second conductive sub-layer on a side of the first conductive sub-layer away from the piezoelectric layer; and the second conductive sub-layer has a thickness greater than a thickness of the first conductive sub-layer along a thickness direction from the base substrate to the second electrode layer.

Optionally, the second electrode layer comprises a single electrode; the single electrode comprises a plurality of rows and a plurality of columns intersecting with each other and being interconnected to each other.

Optionally, the array of the plurality of first electrodes comprises a plurality of rows of first electrodes and a plurality of columns of first electrodes; the one or more second electrodes comprise a plurality of rows of second electrodes; and a respective row of the plurality of rows of second electrodes comprises a bar electrode crossing over the plurality of columns of first electrodes.

In another aspect, the present disclosure provides a display apparatus, comprising the ultrasonic fingerprint sensor apparatus described herein or fabricated by a method described herein; and a plurality of thin film transistors on a side of the base substrate away from the first electrode layer.

In another aspect, the present disclosure provides a method of detecting fingerprint information, comprising providing a first electrode layer on a base substrate, wherein the first electrode layer comprises an array of a plurality of first electrodes spaced apart from each other by an inter-electrode region; providing a piezoelectric layer on a side of the first electrode layer away from the base substrate; providing a second electrode layer on a side of the piezoelectric layer away from the base substrate, wherein the second electrode layer comprises one or more second electrodes; an orthographic projection of the plurality of first electrodes on the base substrate is substantially non-overlapping with an orthographic projection of the second electrode layer on the base substrate; transmitting a scanning signal to a respective one of the one or more second electrodes to generate an ultrasonic signal by the piezoelectric layer; converting a reflected ultrasonic signal by the piezoelectric layer into a sensing signal; and transmitting the sensing signal through a respective one of the plurality of first electrodes to a fingerprint sensing integrated circuit.

Optionally, the one or more second electrodes comprise a plurality of second electrodes, and transmitting the scanning signal to the respective one of the one or more second electrodes to generate the ultrasonic signal by the piezoelectric layer comprises transmitting at least two scanning signals respectively to at least two second electrodes of the plurality second electrodes to generate at least two ultrasonic signals according to a beamforming pattern; wherein the beamforming pattern focuses the at least two ultrasonic signals to a location at a touch interface; and at least one of the at least two ultrasonic signals is phase delayed with respect to at least another of the at least two ultrasonic signals.

Optionally, the array of the plurality of first electrodes comprises a plurality of rows of first electrodes and a plurality of columns of first electrodes; the one or more second electrodes comprises a plurality of rows of second electrodes; and a respective row of the plurality of rows of second electrodes comprises a bar electrode crossing over the plurality of columns of first electrodes; wherein transmitting at least two scanning signals respectively to at least two second electrodes of the plurality of second electrodes to generate at least two ultrasonic signals according to a beamforming pattern comprises transmitting at least two scanning signals respectively to at least two bar electrodes of the plurality of rows of second electrodes, wherein the at least two bar electrodes respectively cross over the plurality of columns of first electrodes; and transmitting the sensing signal through the respective one of the plurality of first electrodes to the fingerprint sensing integrated circuit comprises transmitting the sensing signal to the fingerprint sensing integrated circuit through one or more rows of the plurality of rows of first electrodes corresponding to at least one of the at least two bar electrodes.

Optionally, the method further comprises providing a first reference electrode layer between the base substrate and the piezoelectric layer; and transmitting a first reference voltage to the first reference electrode layer; wherein the first reference electrode layer is in the inter-electrode region and spaced apart from the plurality of first electrodes; and an orthographic projection of the first reference electrode layer on the base substrate at least partially overlaps with an orthographic projection of a respective one of the one or more second electrodes on the base substrate.

Optionally, the method further comprises providing a second reference electrode layer; and transmitting a second reference voltage to the second reference electrode layer; wherein an orthographic projection of the second reference electrode layer on the base substrate at least partially overlaps with an orthographic projection of a respective one of the plurality of first electrodes on the base substrate.

Optionally, providing the second reference electrode layer comprises providing a plurality of second reference electrodes; and an orthographic projection of a respective one of the plurality of second reference electrodes on the base substrate at least partially overlaps with an orthographic projection of a respective one of the plurality of first electrodes on the base substrate.

In another aspect, the present disclosure provides a method of fabricating an ultrasonic fingerprint sensor apparatus, comprising forming a first electrode layer on a base substrate, wherein forming the first electrode layer comprises forming an array of a plurality of first electrodes spaced apart from each other by an inter-electrode region; forming a piezoelectric layer on a side of the first electrode layer away from the base substrate; forming a second electrode layer on a side of the piezoelectric layer away from the base substrate, wherein forming the second electrode layer comprises forming one or more second electrodes; and forming a first reference electrode layer configured to provide a first reference voltage; wherein an orthographic projection of the first electrode layer on the base substrate is substantially non-overlapping with an orthographic projection of the second electrode layer on the base substrate; and the first electrode layer and the first reference electrode layer are formed between the base substrate and the piezoelectric layer.

Optionally, forming a respective one of the one or more second electrodes comprises forming a first conductive sub-layer in direct contact with the piezoelectric layer and forming a second conductive sub-layer on a side of the first conductive sub-layer away from the piezoelectric layer.

Optionally, the method further comprises forming an insulating barrier layer on a side of the piezoelectric layer away from the base substrate; wherein forming the insulating barrier layer comprises forming a plurality of barrier blocks; an orthographic projection of a respective one of the plurality of barrier blocks on the base substrate is substantially non-overlapping with the orthographic projection of the second electrode layer on the base substrate; and an orthographic projection of a respective one of the plurality of barrier blocks on the base substrate at least partially overlaps with an orthographic projection of a respective one of the plurality of first electrodes on the base substrate;

wherein forming the insulating barrier layer is performed subsequent to forming the first conductive sub-layer and prior to forming the second conductive sub-layer.

Optionally, the method further comprises forming a first reference electrode layer between the base substrate and the piezoelectric layer; wherein the first reference electrode layer is formed in the inter-electrode region and spaced apart from the plurality of first electrodes; and an orthographic projection of the first reference electrode layer on the base substrate at least partially overlaps with an orthographic projection of a respective one of the one or more second electrodes on the base substrate.

Optionally, the method further comprises forming a second reference electrode layer comprising a plurality of second reference electrodes; wherein an orthographic projection of a respective one of the plurality of second reference electrodes on the base substrate at least partially overlaps with an orthographic projection of a respective one of the plurality of first electrodes on the base substrate; wherein the first conductive sub-layer and the plurality of second reference electrodes are in a same layer and comprise a same conductive material.

BRIEF DESCRIPTION OF THE FIGURES

The following drawings are merely examples for illustrative purposes according to various disclosed embodiments and are not intended to limit the scope of the present disclosure.

FIGS. 14A to 14I illustrate a method of fabricating an ultrasonic fingerprint sensor apparatus in some embodiments according to the present disclosure.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

The present disclosure provides, inter alia, an ultrasonic fingerprint sensor apparatus, a display device, a method of detecting fingerprint information, and a method of fabricating an ultrasonic fingerprint sensor apparatus that substantially obviate one or more of the problems due to limitations and disadvantages of the related art. In one aspect, the present disclosure provides an ultrasonic fingerprint sensor apparatus. In some embodiments, the ultrasonic fingerprint sensor apparatus includes a base substrate; a first electrode layer on the base substrate, and including an array of a plurality of first electrodes spaced apart from each other by an inter-electrode region; a piezoelectric layer on a side of the first electrode layer away from the base substrate; a second electrode layer on a side of the piezoelectric layer away from the base substrate, and comprising one or more second electrodes; and a first reference electrode layer configured to provide a first reference voltage. Optionally, an orthographic projection of the first electrode layer on the base substrate is substantially non-overlapping with an orthographic projection of the second electrode layer on the base substrate. Optionally, the first electrode layer and the first reference electrode layer are between the base substrate and the piezoelectric layer.

Figure 1:
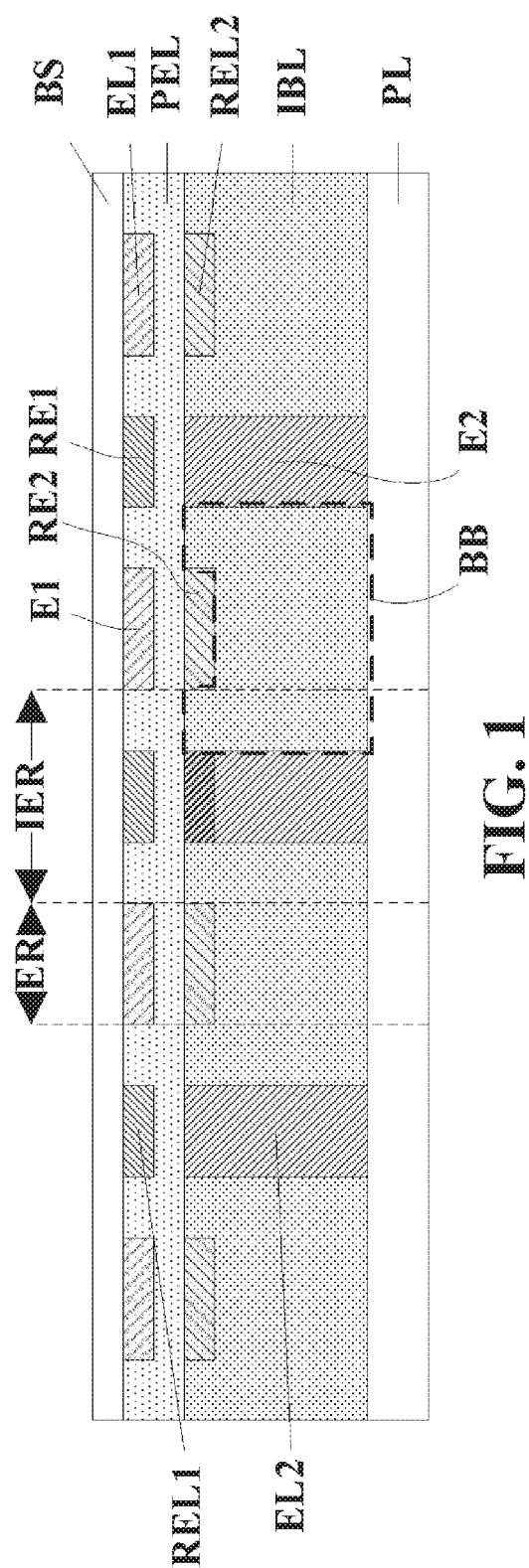
FIG. 1 is a schematic diagram of the structure of an ultrasonic fingerprint sensor apparatus in some embodiments according to the present disclosure.
Figure 3:
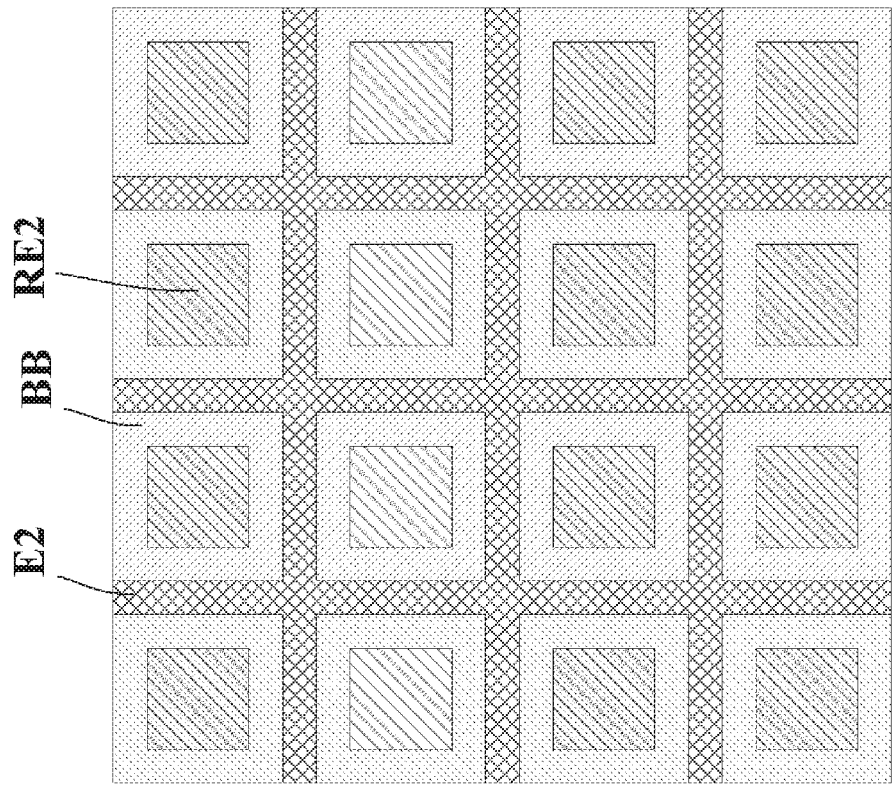
FIG. 3 is a plan view of an insulating barrier layer, a second electrode layer, and a second reference electrode layer in an ultrasonic fingerprint sensor apparatus in some embodiments according to the present disclosure.
Figure 2:
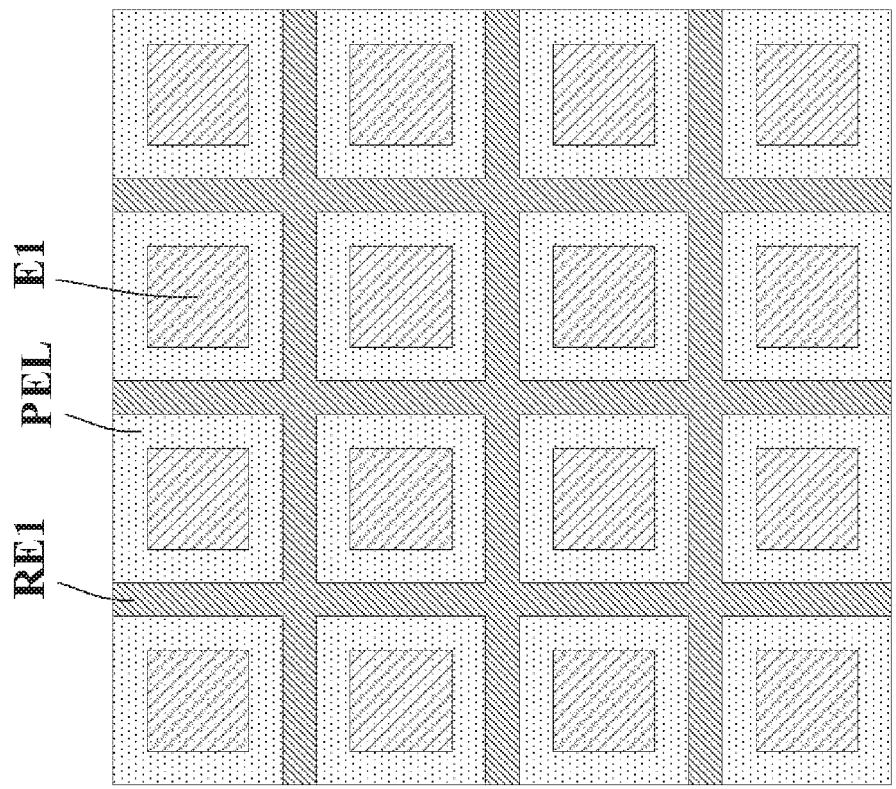
FIG. 2 is a plan view of a piezoelectric layer, a first electrode layer, and a first reference electrode layer in an ultrasonic fingerprint sensor apparatus in some embodiments according to the present disclosure.
Figure 4:
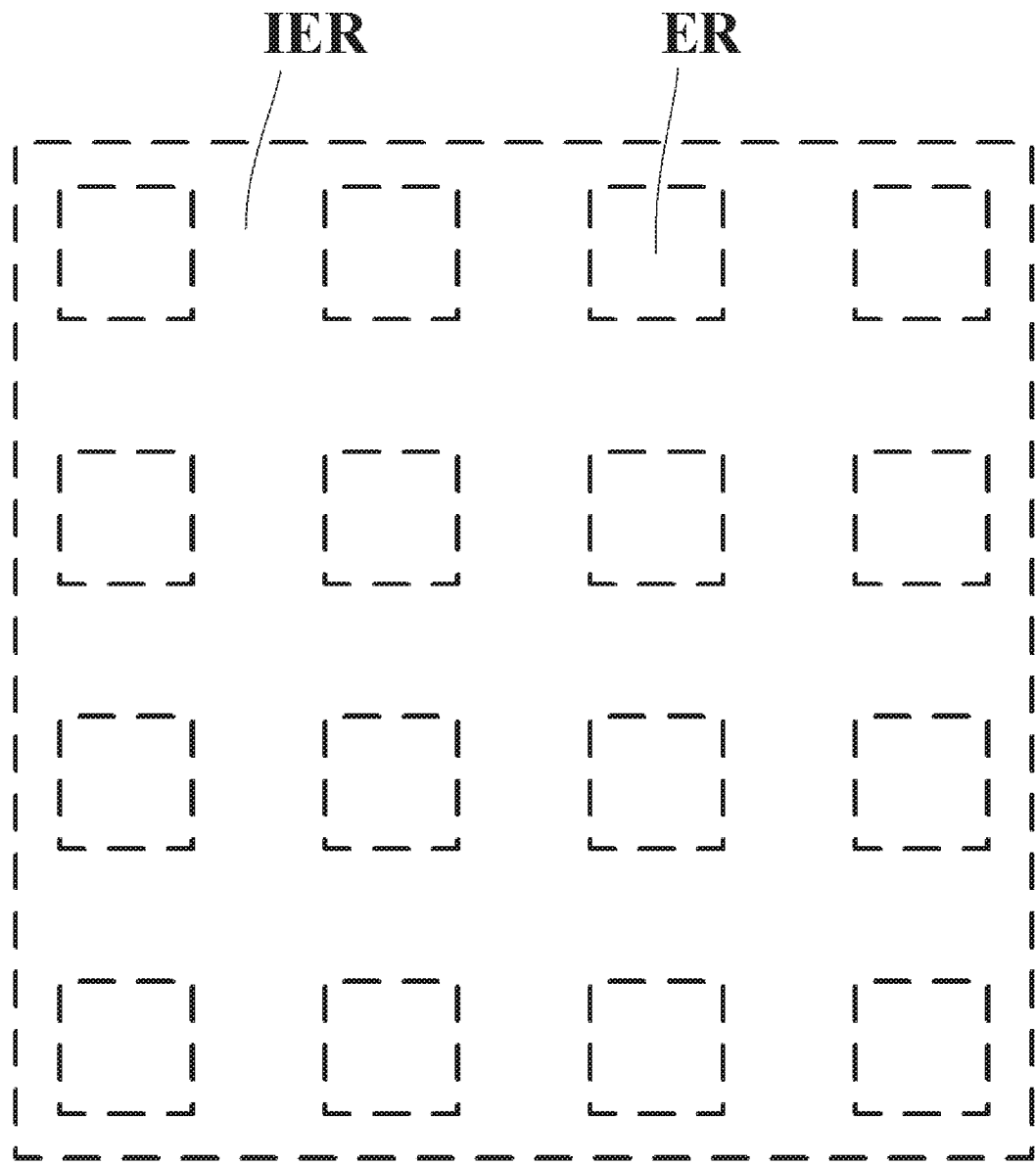
FIG. 4 illustrates a plurality of electrode regions and an inter-electrode region in an ultrasonic fingerprint sensor apparatus in some embodiments according to the present disclosure.

FIG. 1 is a cross-section view of an ultrasonic fingerprint sensor apparatus in some embodiments according to the present disclosure. FIG. 2 is a plan view of a piezoelectric layer, a first electrode layer, and a first reference electrode layer in an ultrasonic fingerprint sensor apparatus in some embodiments according to the present disclosure. FIG. 3 is a plan view of an insulating barrier layer, a second electrode layer, and a second reference electrode layer in an ultrasonic fingerprint sensor apparatus in some embodiments according to the present disclosure. FIG. 4 illustrates a plurality of electrode regions and an inter-electrode region in an ultrasonic fingerprint sensor apparatus in some embodiments according to the present disclosure. Referring to FIGS. 1 to 4, in some embodiments, the ultrasonic fingerprint sensor apparatus includes a base substrate BS; a first electrode layer EL1 on the base substrate BS, and including an array of a plurality of first electrodes E1 spaced apart from each other by an inter-electrode region IER; a piezoelectric layer PEL on a side of the first electrode layer EL1 away from the base substrate BS; a second electrode layer EL2 on a side of the piezoelectric layer PEL away from the base substrate BS, and including one or more second electrodes E2; and a first reference electrode layer REL1 configured to provide a first reference voltage for the one or more second electrodes E2. Optionally, the first electrode layer EL1 and the first reference electrode layer REL1 are between the base substrate BS and the piezoelectric layer PEL.

Optionally, the plurality of first electrodes E1 are a plurality of receiving electrodes. Optionally, the one or more second electrodes E2 are one or more transmitting electrodes.

Optionally, the plurality of first electrodes E1 are a plurality of transmitting electrodes. Optionally, the one or more second electrodes E2 are one or more receiving electrodes.

In some embodiments, the ultrasonic fingerprint sensor apparatus further includes an insulating barrier layer IBL on a side of the piezoelectric layer PEL away from the base substrate BS. Optionally, the insulating barrier layer IBL includes a plurality of barrier blocks BB. In some embodiments, the ultrasonic fingerprint sensor apparatus further includes a second reference electrode layer REL2 configured to provide a second reference voltage for the first electrode layer EL1. The second reference electrode layer REL2 includes a plurality of second reference electrode RE2 respectively corresponding to the plurality of first electrodes E1.

Referring to FIGS. 1, 2, and 4, the plurality of first electrodes E1 are respectively in a plurality of electrode regions ER. The plurality of first electrodes E1 are spaced apart from each other by an inter-electrode region IER. The first reference electrode layer REL1 is in the inter-electrode region and includes one or more first reference electrodes RE1. The one or more first reference electrodes RE1 are spaced apart from each of the plurality of first electrodes E1, e.g., by the piezoelectric layer PEL.

In some embodiments, the plurality of second reference electrodes RE2 are respectively in a plurality of electrode regions ER. Optionally, the plurality of second reference electrodes RE2 are spaced apart from each other by an inter-electrode region IER. Optionally, the second electrode layer EL2 is in the inter-electrode region and includes one or more second electrodes E2. The one or more second electrodes E2 are spaced apart from each of the plurality of second reference electrodes RE2, e.g., by the insulating barrier layer IBL.

Referring to FIG. 2, in some embodiments, the one or more first reference electrodes RE1 has a network structure having a plurality of rows and a plurality of columns intersecting each other, thereby dividing the ultrasonic fingerprint sensor apparatus into a plurality of regions respectively containing the plurality of first electrodes E1. Optionally, the first reference electrode layer REL1 includes a single electrode. A respective one of the plurality of first electrodes E1 is surrounded by a portion of the piezoelectric layer PEL along substantially an entirety of a perimeter of the respective one of the plurality of first electrodes E1 in plan view of the ultrasonic fingerprint sensor apparatus. As used herein, the term "substantially an entirety" refers to at least 80% of a base value (for example, a perimeter), e.g., at least 80%, at least 85%, at least 90%, at least 95%, at least 99%, or 100% of the base value.

Referring to FIG. 3, in some embodiments, the one or more second electrodes E2 has a network structure having a plurality of rows and a plurality of columns intersecting each other, thereby dividing the ultrasonic fingerprint sensor apparatus into a plurality of regions respectively containing the plurality of second reference electrodes RE2. Optionally, the second electrode layer EL2 includes a single electrode. A respective one of the plurality of second reference electrodes RE2 is surrounded by a respective one of the plurality of barrier blocks BB along substantially an entirety of a perimeter of the respective one of the plurality of second reference electrodes RE2 in plan view of the ultrasonic fingerprint sensor apparatus.

Referring to FIGS. 1 to 3, in some embodiments, an orthographic projection of the first electrode layer EL1 on the base substrate BS is substantially non-overlapping with an orthographic projection of the second electrode layer EL2 on the base substrate BS. As used herein, the term "substantially non-overlapping" refers to two orthographic projections being at least 50 percent (e.g., at least 60 percent, at least 70 percent, at least 80 percent, at least 90 percent, at least 95 percent, at least 99 percent, or 100 percent) non-overlapping. Optionally, the orthographic projection of the first electrode layer EL1 on the base substrate BS is completely non-overlapping with an orthographic projection of the second electrode layer EL2 on the base substrate BS.

Optionally, the orthographic projection of the first reference electrode layer REL1 on the base substrate BS at least partially overlaps with an orthographic projection of a respective one of the one or more second electrodes E2 on the base substrate BS. Optionally, the orthographic projection of the one or more first reference electrodes RE1 on the base substrate BS substantially overlaps with, and is substantially co-extensive with, the orthographic projection of the respective one of the one or more second electrodes E2 on the base substrate BS. As used herein, the term "substantially overlap" refers to two orthographic projections at least 50 percent, e.g., at least 60 percent, at least 70 percent, at least 80 percent, at least 90 percent, at least 95 percent, at least 99 percent, or 100 percent overlapping with each other. As used herein, the term "substantially co-extensive" refers to at least 80 percent, at least 90 percent, at least 95 percent, at least 99 percent, or 100 percent co-extensive.

Optionally, an orthographic projection of a respective one of the plurality of barrier blocks BB on the base substrate BS is substantially non-overlapping with the orthographic projection of the second electrode layer EL2 on the base substrate BS. Optionally, the orthographic projection of the respective one of the plurality of barrier blocks BB on the base substrate BS is completely non-overlapping with the orthographic projection of the second electrode layer EL2 on the base substrate BS.

Optionally, an orthographic projection of a respective one of the plurality of barrier blocks BB on the base substrate BS at least partially overlaps with an orthographic projection of a respective one of the plurality of first electrodes E1 on the base substrate BS. Optionally, the orthographic projection of the respective one of the plurality of barrier blocks BB on the base substrate BS covers the orthographic projection of the respective one of the plurality of first electrodes E1 on the base substrate BS.

Optionally, an orthographic projection of a respective one of the plurality of barrier blocks BB on the base substrate BS at least partially overlaps with an orthographic projection of a respective one of the plurality of second reference electrodes RE2 on the base substrate BS. Optionally, the orthographic projection of the respective one of the plurality of barrier blocks BB on the base substrate BS covers the orthographic projection of a respective one of the plurality of second reference electrodes RE2 on the base substrate BS.

Optionally, an orthographic projection of the second reference electrode layer REL2 on the base substrate BS at least partially overlaps with an orthographic projection of a respective one of the plurality of first electrodes E1 on the base substrate BS. Optionally, the orthographic projection of the second reference electrode layer REL2 on the base substrate BS substantially overlaps with, and is substantially co-extensive with, the orthographic projection of the respective one of the plurality of first electrodes E1 on the base substrate BS. Optionally, an orthographic projection of a respective one of the plurality of second reference electrodes RE2 on the base substrate BS at least partially overlaps with the orthographic projection of the respective one of the plurality of first electrodes E1 on the base substrate BS. Optionally, the orthographic projection of the respective one of the plurality of second reference electrodes RE2 on the base substrate BS substantially overlaps with, and is substantially co-extensive with, the orthographic projection of the respective one of the plurality of first electrodes E1 on the base substrate BS.

Optionally, an orthographic projection of the respective one of the plurality of barrier blocks BB on the base substrate BS is substantially non-overlapping with the orthographic projection of the second electrode layer EL2 on the base substrate BS. Optionally, an orthographic projection of the respective one of the plurality of barrier blocks BB on the base substrate BS is completely non-overlapping with the orthographic projection of the second electrode layer EL2 on the base substrate BS.

Referring to FIG. 1, in some embodiments, the first electrode layer EL1 and the first reference electrode layer REL1 are spaced apart, by the piezoelectric layer PEL, from the second electrode layer EL2, the second reference electrode layer REL2, and the insulating barrier layer IBL. Optionally, the first electrode layer EL1 is in direct contact with the piezoelectric layer PEL, the second reference electrode layer REL2 is in direct contact with the piezoelectric layer PEL, the first electrode layer EL1 and the second reference electrode layer REL2 are on two opposite sides of the piezoelectric layer PEL, with the second reference electrode layer REL2 providing the second reference voltage for the first electrode layer EL1. Optionally, the second electrode layer EL2 is in direct contact with the piezoelectric layer PEL, the first reference electrode layer REL1 is in direct contact with the piezoelectric layer PEL, the second electrode layer EL2 and the first reference electrode layer REL1 are on two opposite sides of the piezoelectric layer PEL, with the first reference electrode layer REL1 providing the first reference voltage for the second electrode layer EL2. Optionally, each of the plurality of insulating barrier blocks is in direct contact with the piezoelectric layer PEL.

In some embodiments, the ultrasonic fingerprint sensor apparatus further includes a protective layer PL on a side of the second electrode layer EL2 and the insulating barrier layer IBL away from the base substrate BS. Optionally, the protective layer PL includes an organic insulating material, e.g., an epoxy polymer.

Figure 5:
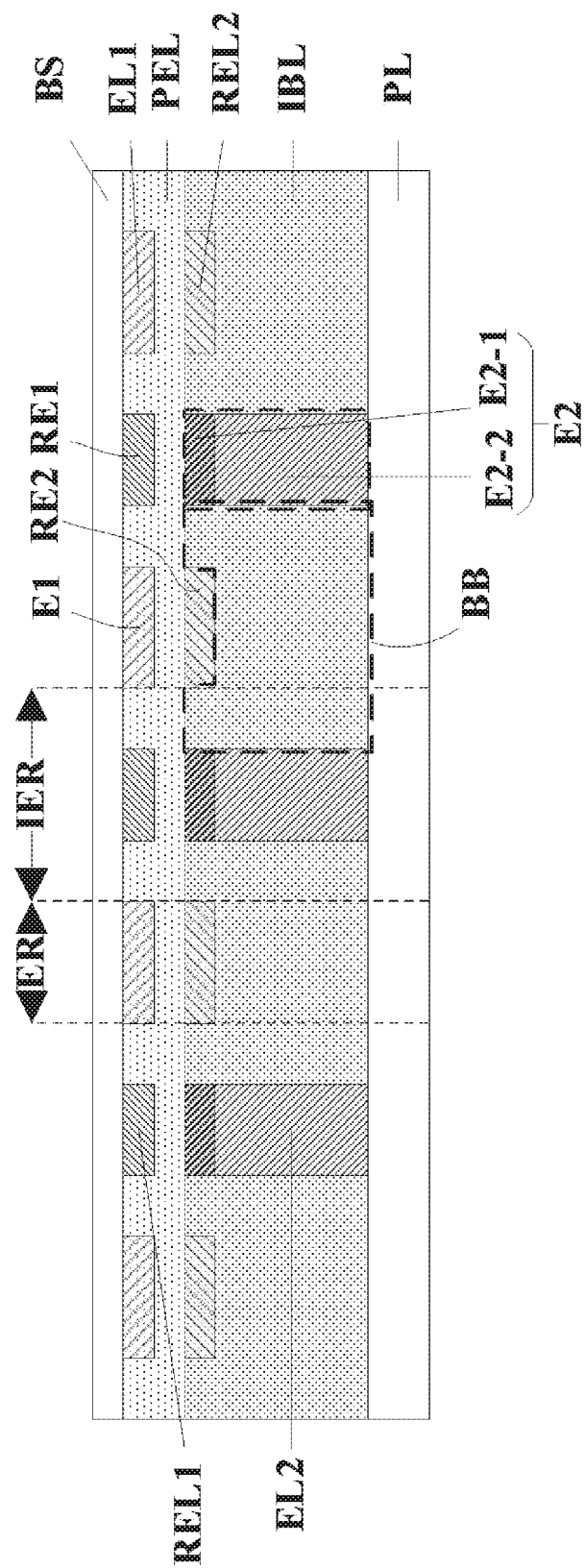
FIG. 5 is a schematic diagram of the structure of an ultrasonic fingerprint sensor apparatus in some embodiments according to the present disclosure.

FIG. 5 is a cross-section view of an ultrasonic fingerprint sensor apparatus in some embodiments according to the present disclosure. Referring to FIG. 5, in some embodiments, a respective one of the one or more second electrodes E2 includes a first conductive sub-layer E2-1 in direct contact with the piezoelectric layer PEL and a second conductive sub-layer E2-2 on a side of the first conductive sub-layer E2-1 away from the piezoelectric layer PEL. Optionally, the first conductive sub-layer E2-1 and the plurality of second reference electrodes RE2 are in a same layer. Optionally, the first conductive sub-layer E2-1 and the plurality of second reference electrodes RE2 include a same conductive material. As used herein, the term "same layer" refers to the relationship between the layers simultaneously formed in the same step. In one example, the first conductive sub-layer E2-1 and the plurality of second reference electrodes RE2 are in a same layer when they are formed as a result of one or more steps of a same patterning process performed in a material deposited in a same deposition process. In another example, the first conductive sub-layer E2-1 and the plurality of second reference electrodes RE2 can be formed in a same layer by simultaneously performing the step of forming the first conductive sub-layer E2-1 and the step of forming the plurality of second reference electrodes RE2. The term "same layer" does not always mean that the thickness of the layer or the height of the layer in a cross-sectional view is the same.

Optionally, the first conductive sub-layer E2-1 and the plurality of second reference electrodes RE2 have a substantially same thickness along thickness direction from the base substrate BS to the second electrode layer EL2, for example, along the thickness direction from the base substrate BS to the second electrode layer EL2 and intersecting the piezoelectric layer PEL. As used herein, the term "substantially same" refers to a difference between two values not exceeding 10% of a base value (e.g., one of the two values), e.g., not exceeding 8%, not exceeding 6%, not exceeding 4%, not exceeding 2%, not exceeding 1%, not exceeding 0.5%, not exceeding 0.1%, not exceeding 0.05%, and not exceeding 0.01%, of the base value.

Optionally, the first conductive sub-layer E2-1 and the plurality of second reference electrodes RE2 are in direct contact with the piezoelectric layer PEL. Optionally, the respective one of the plurality of barrier blocks BB spaces apart the respective one of the plurality of second reference electrodes RE2 from the one or more second electrodes E2.

Optionally, the second conductive sub-layer E2-2 has a thickness greater than a thickness of the first conductive sub-layer E2-1 along a thickness direction from the base substrate BS to the second electrode layer EL2, for example, along the thickness direction from the base substrate BS to the second electrode layer EL2 and intersecting the piezoelectric layer PEL.

Figure 6:
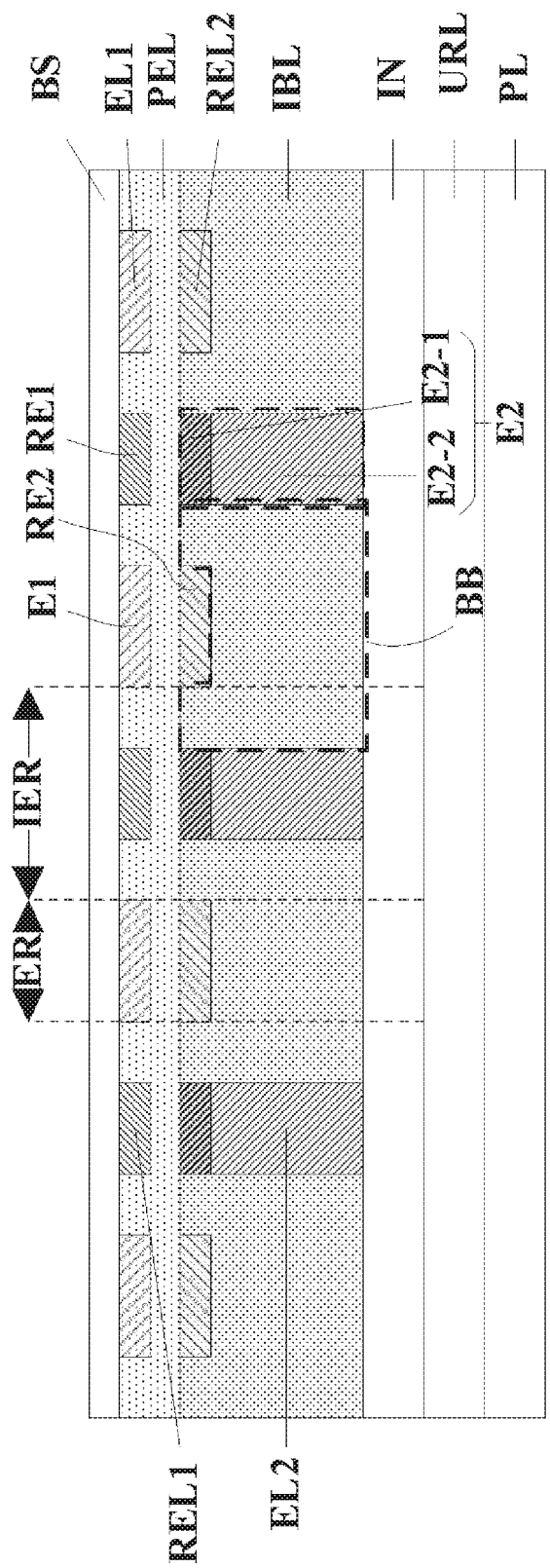
FIG. 6 is a schematic diagram of the stricture of an ultrasonic fingerprint sensor apparatus in some embodiments according to the present disclosure.

FIG. 6 is a schematic diagram of the structure of an ultrasonic fingerprint sensor apparatus in some embodiments according to the present disclosure. Referring to FIG. 6, in some embodiments, the ultrasonic fingerprint sensor apparatus further includes an insulating layer IN on a side of the second electrode layer EL2 and the insulating barrier layer IBL away from the base substrate BS; and an ultrasonic reflective layer URL on a side of the insulating layer IN away from the base substrate BS. Optionally, the ultrasonic fingerprint sensor apparatus further includes a protective layer PL on a side of the ultrasonic reflective layer URL away from the insulating layer IN. By having an ultrasonic reflective layer URL on a side of the insulating layer IN away from the base substrate BS, the ultrasound signal transmitted from the second electrode layer EL2 can be reflected toward the base substrate BS, enhancing the signal strength transmitted to a finger.

Figure 7:
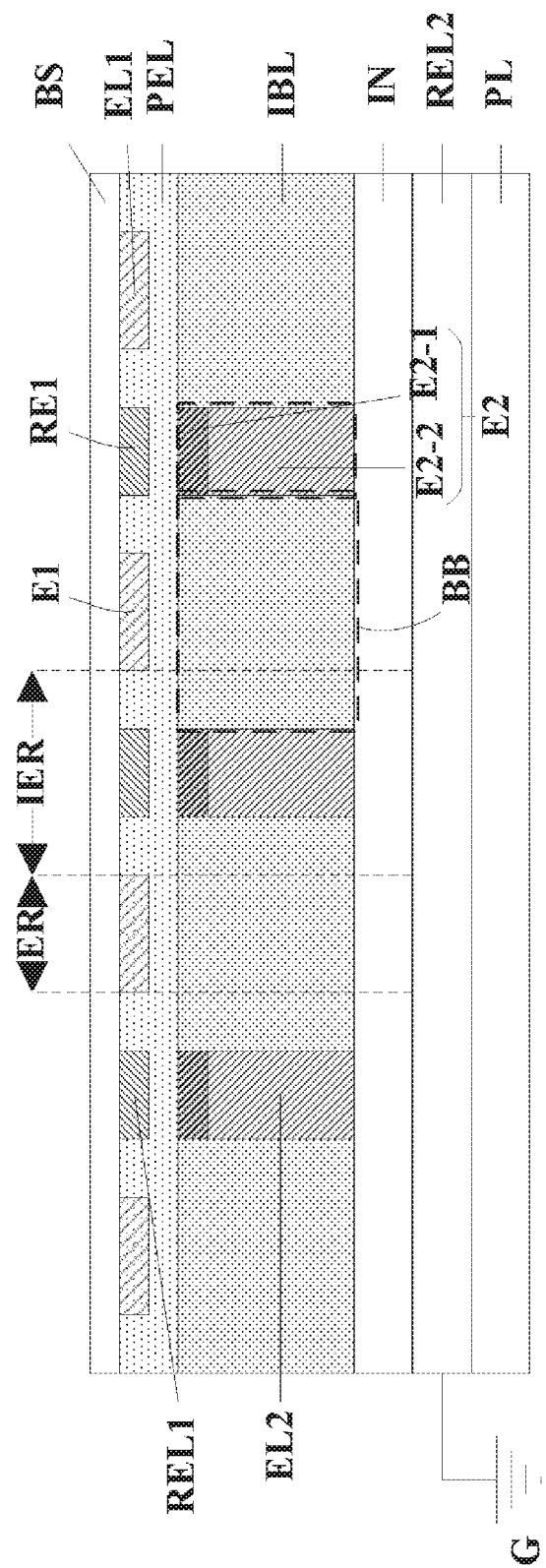
FIG. 7 is a schematic diagram of the structure of an ultrasonic fingerprint sensor apparatus in some embodiments according to the present disclosure.

In some embodiments, the second reference electrode layer REL2 is on a side of the second electrode layer EL2 away from the base substrate BS. FIG. 7 is a schematic diagram of the structure of an ultrasonic fingerprint sensor apparatus in some embodiments according to the present disclosure. Referring to FIG. 7, in some embodiments, the ultrasonic fingerprint sensor apparatus further includes an insulating layer IN on a side of the second electrode layer EL2 and the insulating barrier layer IBL away from the base substrate BS; and a second reference electrode layer REL2 on a side of the insulating layer IN away from the base substrate BS. Optionally, the ultrasonic fingerprint sensor apparatus further includes a protective layer PL on a side of the second reference electrode layer REL2 away from the insulating layer IN. Optionally, the second reference electrode layer REL2 is a unitary layer extending continuously throughout substantially an entirety of the base substrate BS. By having the second reference electrode layer REL2 on a side of the second electrode layer EL2 away from the base substrate BS, the second reference electrode layer REL2 can function as an ultrasonic reflective layer to reflect the ultrasound signal transmitted from the second electrode layer EL2 toward the base substrate BS, enhancing the signal strength transmitted to a finger. Moreover, by having this setup, the second electrode layer EL2 is spaced apart further from the second reference electrode layer REL2, with a lower dielectric in layers between the second electrode layer EL2 and the second reference electrode layer REL2, thereby enhancing the detection sensitivity.

Figure 8:
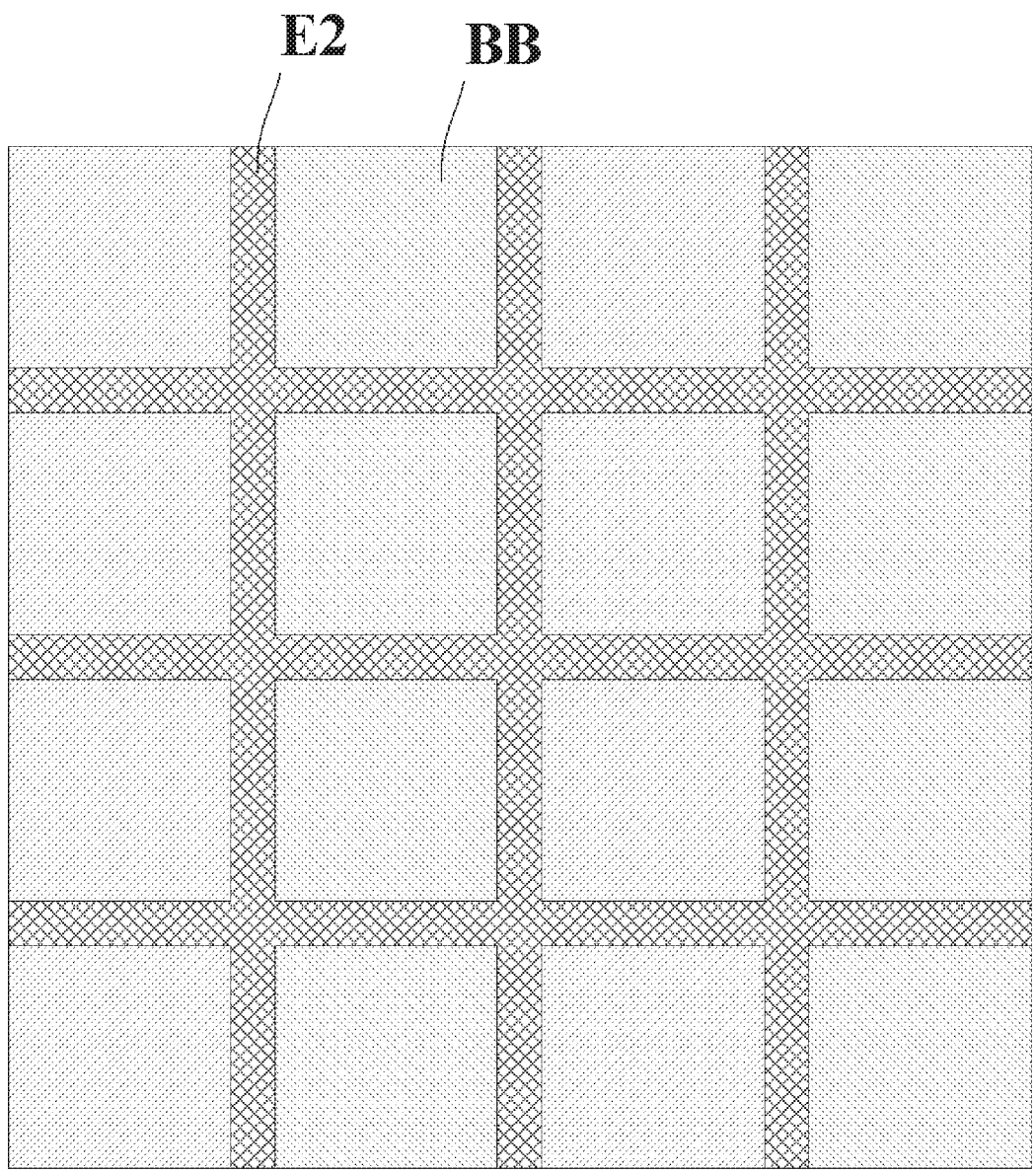
FIG. 8 is a plan view of an insulating barrier layer and a second electrode layer in an ultrasonic fingerprint sensor apparatus in some embodiments according to the present disclosure.

FIG. 8 is a plan view of an insulating barrier layer and a second electrode layer in an ultrasonic fingerprint sensor apparatus in some embodiments according to the present disclosure. Referring to FIG. 8, in some embodiments, the one or more second electrodes E2 has a network structure having a plurality of rows and a plurality of columns intersecting each other, thereby dividing the ultrasonic fingerprint sensor apparatus into a plurality of regions respectively containing the plurality of insulating barrier blocks BB.

Figure 9:
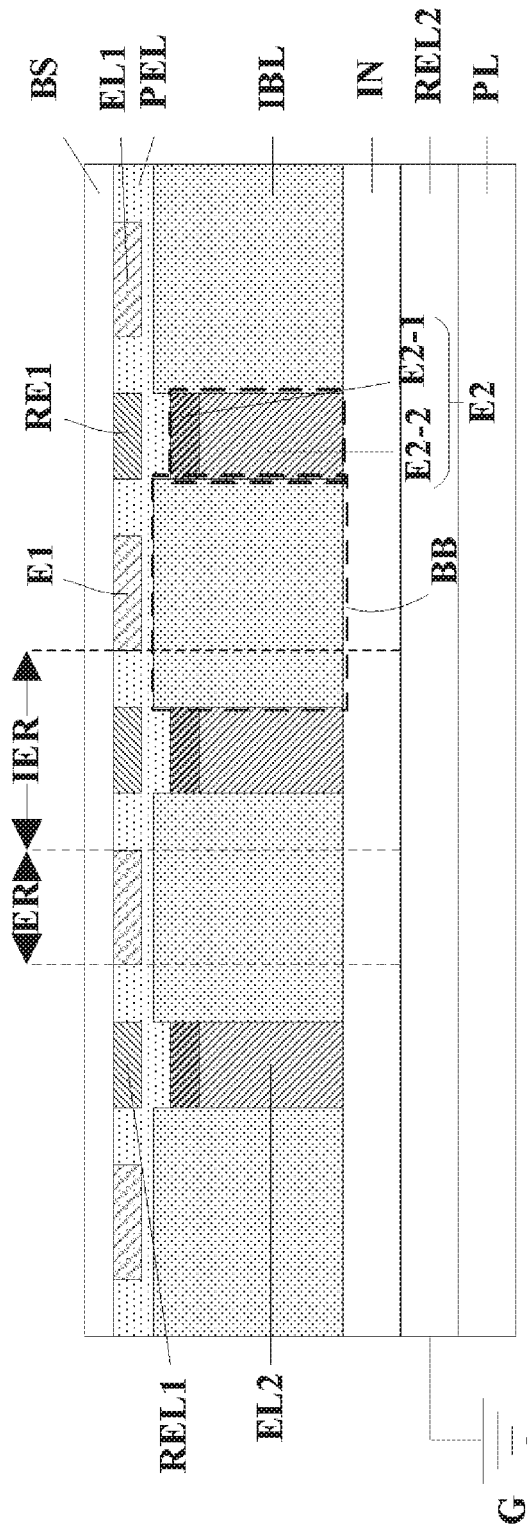
FIG. 9 is a schematic diagram of the structure of an ultrasonic fingerprint sensor apparatus in some embodiments according to the present disclosure.
Figure 10:
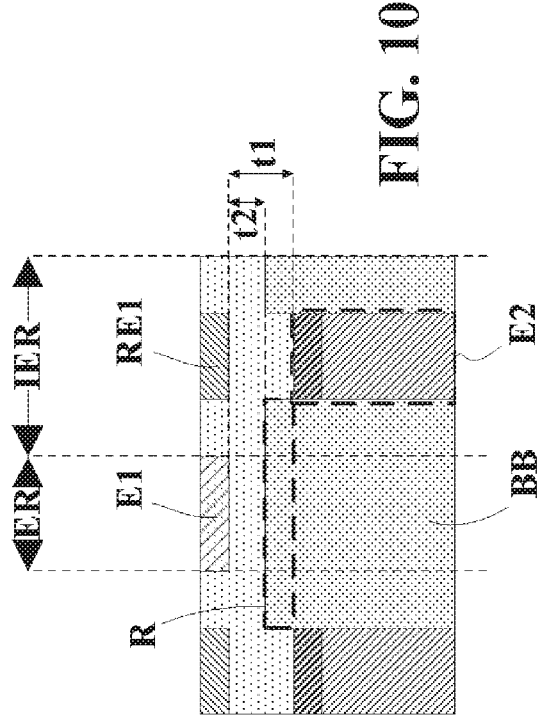
FIG. 10 is a zoom in view of a region corresponding to a respective one of a plurality of insulating barrier blocks in FIG. 8.

FIG. 9 is a schematic diagram of the structure of an ultrasonic fingerprint sensor apparatus in some embodiments according to the present disclosure. FIG. 10 is a zoom in view of a region corresponding to a respective one of a plurality of insulating barrier blocks in FIG. 8. Referring to FIG. 9 and FIG. 10, in some embodiments, the ultrasonic fingerprint sensor apparatus includes a plurality of recesses R respectively extending into the piezoelectric layer PEL. A respective one of the plurality of insulating barrier blocks BB extends into a respective one of the plurality of recesses R. As shown in FIG. 9 and FIG. 10, a respective one of the one or more second electrodes E2 is spaced apart from a respective one of the one or more first reference electrode RE1 by a portion of the piezoelectric layer PEL having a first thickness t1 along the thickness direction from the second electrode layer EL2 to the base substrate BS, a respective one of the plurality of first electrodes E1 is spaced apart from a respective one of the plurality of insulating barrier blocks BB by a portion of the piezoelectric layer PEL having a second thickness t2 along the thickness direction from the second electrode layer EL2 to the base substrate BS, the first thickness t1 is greater than the second thickness t2. Optionally, the plurality of first electrodes E1 are receiving electrodes and the one or more second electrodes E2 are transmitting electrodes. Accordingly, in regions corresponding to the receiving electrodes, the piezoelectric layer PEL has a relatively smaller thickness, enhancing the detection sensitivity. In regions corresponding to the transmitting electrodes, the piezoelectric layer PEL has a relatively larger thickness, making it more resistant to the high voltage applied to the transmitting electrodes.

Figure 11:
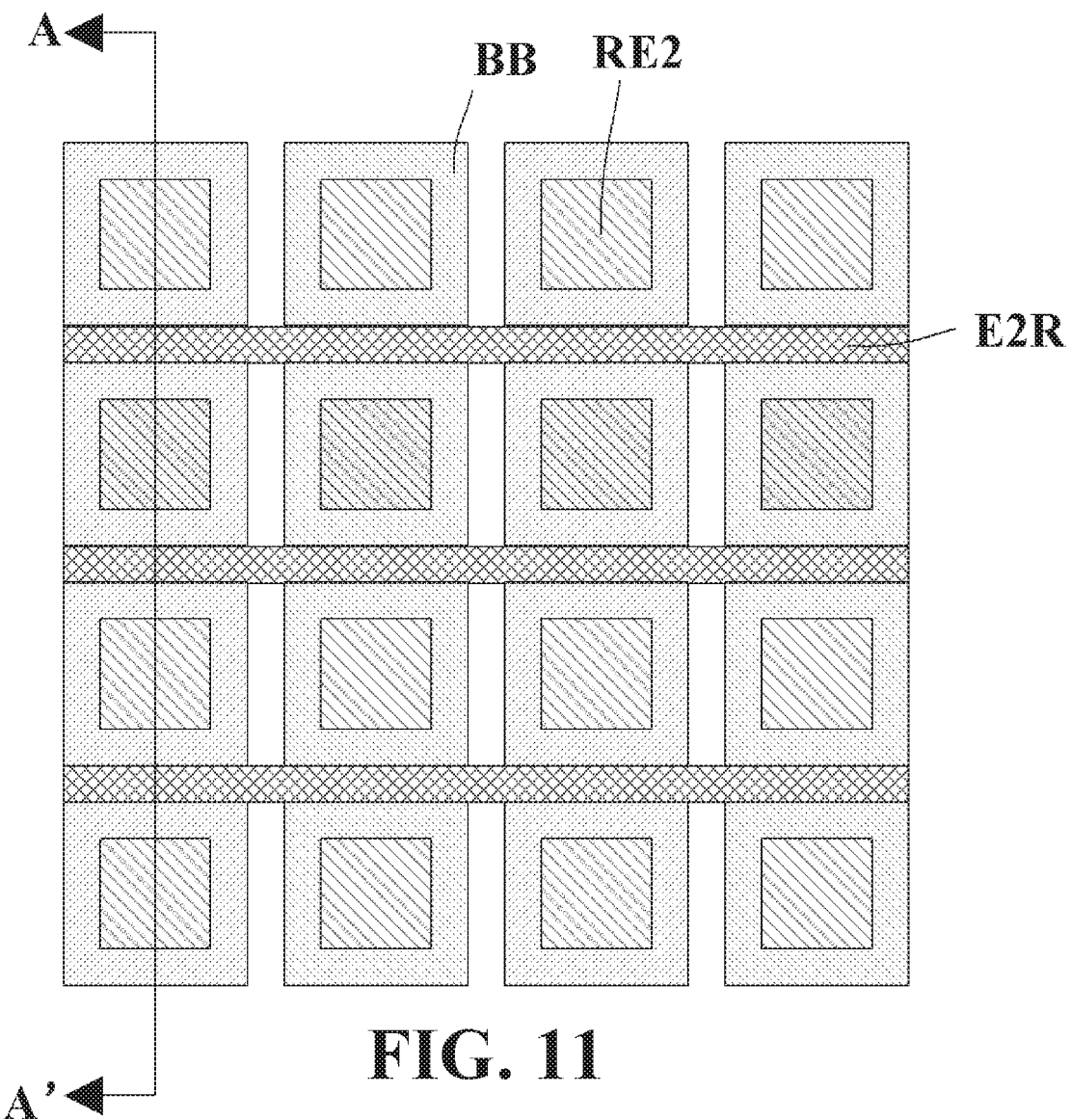
FIG. 11 is a plan view of an insulating barrier layer, a second electrode layer, and a second reference electrode layer in an ultrasonic fingerprint sensor apparatus in some embodiments according to the present disclosure.

In some embodiments, the one or more second electrodes includes a plurality of rows of second electrodes. FIG. 11 is a plan view of an insulating barrier layer, a second electrode layer, and a second reference electrode layer in an ultrasonic fingerprint sensor apparatus in some embodiments according to the present disclosure. Referring to FIG. 1, FIG. 2, and FIG. 11, in some embodiments, the array of the plurality of first electrodes E1 includes a plurality of rows of first electrodes and a plurality of columns of first electrodes (as shown in FIG. 2); the one or more second electrodes include a plurality of rows of second electrodes E2R. Optionally, a respective row of the plurality of rows of second electrodes E2R includes a bar electrode crossing over the plurality of columns of first electrodes.

In another aspect, the present disclosure provides a method of detecting fingerprint information. In some embodiments, the method includes providing a first electrode layer on a base substrate, wherein the first electrode layer includes an array of a plurality of first electrodes spaced apart from each other by an inter-electrode region; providing a piezoelectric layer on a side of the first electrode layer away from the base substrate; and providing a second electrode layer on a side of the piezoelectric layer away from the base substrate, wherein the second electrode layer includes one or more second electrodes; an orthographic projection of the plurality of first electrodes on the base substrate is substantially non-overlapping with an orthographic projection of the second electrode layer on the base substrate; transmitting a scanning signal to a respective one of the one or more second electrodes to generate an ultrasonic signal by the piezoelectric layer; converting a reflected ultrasonic signal by the piezoelectric layer into a sensing signal; and transmitting the sensing signal through a respective one of the plurality of first electrodes to a fingerprint sensing integrated circuit.

In some embodiments, the step of transmitting the scanning signal to the respective one of the one or more second electrodes to generate the ultrasonic signal by the piezoelectric layer includes transmitting multiple scanning signals respectively to multiple second electrodes of the one or more second electrodes to generate multiple ultrasonic signals according to a beamforming pattern. The beamforming pattern focuses the multiple ultrasonic signals to a location at a touch interface. At least one of the multiple ultrasonic signals is phase delayed with respect to at least another of the multiple ultrasonic signals.

Figure 12:
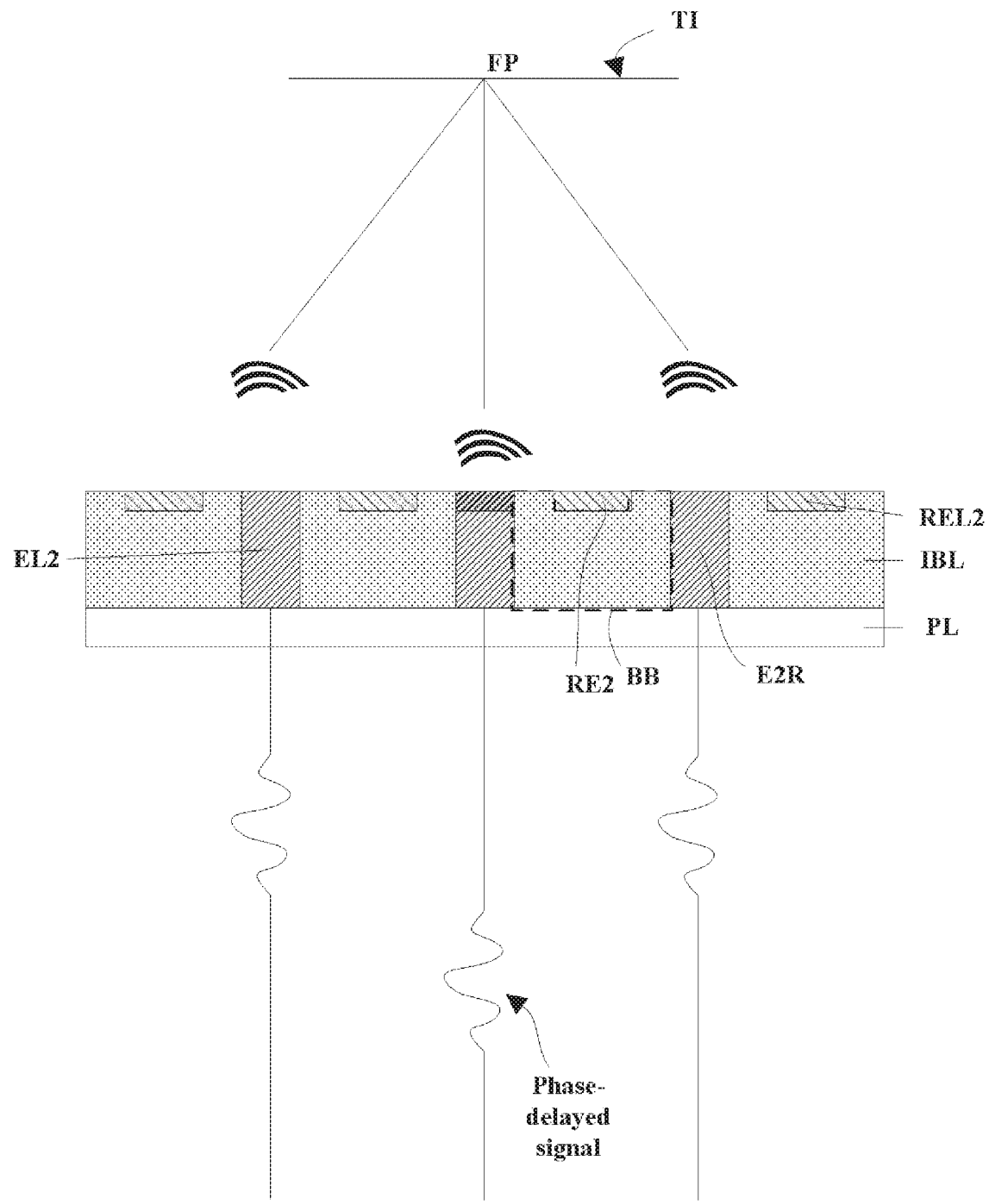
FIG. 12 illustrates formation of a beamforming pattern in an ultrasonic fingerprint sensor apparatus in some embodiments according to the present disclosure.

FIG. 12 illustrates formation of a beamforming pattern in an ultrasonic fingerprint sensor apparatus in some embodiments according to the present disclosure. FIG. 12 is a cross-sectional view along A-A' line in FIG. 11. Referring to FIG. 12, the second electrode layer EL2 includes a plurality of rows of second electrodes E2R. A respective one of the plurality of rows of second electrodes E2R includes a bar electrode. As shown in FIG. 12, in some embodiments, multiple scanning signals are transmitted respectively to multiple bar electrodes of the plurality of rows of second electrodes E2R, to generate multiple ultrasonic signals according to a beamforming pattern. The multiple bar electrodes respectively cross over a plurality of columns of first electrodes. In one example, the scanning signal transmitted to the bar electrode in the middle is a phase-delayed signal. The beamforming pattern focuses the multiple ultrasonic signals to a location (e.g., a focus point FP) at a touch interface TI where a touch occurs. A sensing signal is transmitted to the fingerprint sensing integrated circuit through one or more rows of the plurality of rows of first electrodes corresponding to at least one of the multiple bar electrodes (for example, one or more rows of the plurality of rows of first electrodes in FIG. 2).

When the focus point FP is at a valley of a fingerprint, the reflected beam has a relatively higher energy; when the focus point FP is at a ridge of the fingerprint, the reflected beam has a relatively lower energy. By forming a beamforming pattern, the valley-ridge signal difference can be significantly enhanced. Moreover, the technique reduces valley-ridge signal interference by having a stronger directionality.

Figure 13A:
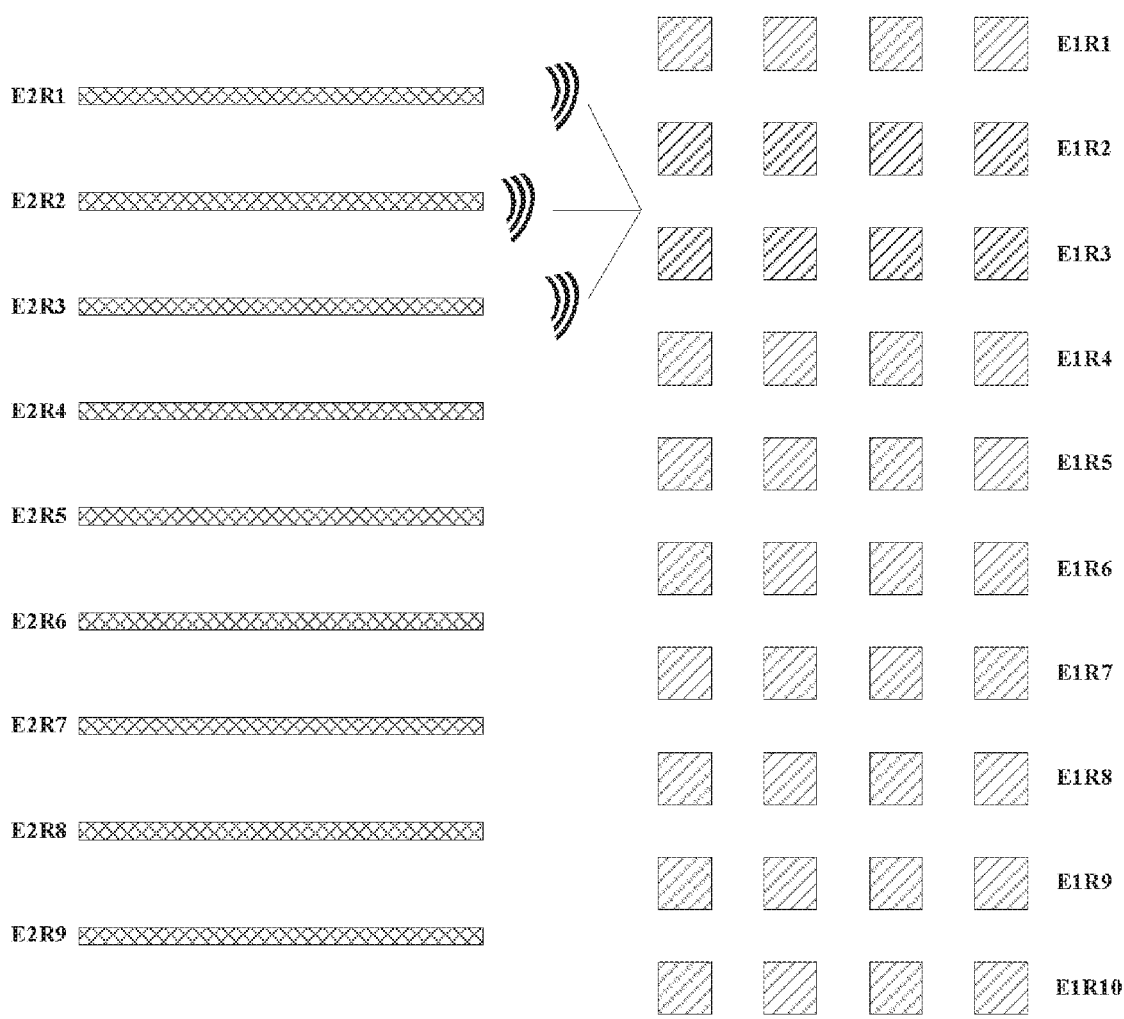
FIGS. 13A to 13C illustrate scanning of a touch interface in an ultrasonic fingerprint sensor apparatus in some embodiments according to the present disclosure.
Figure 13B:
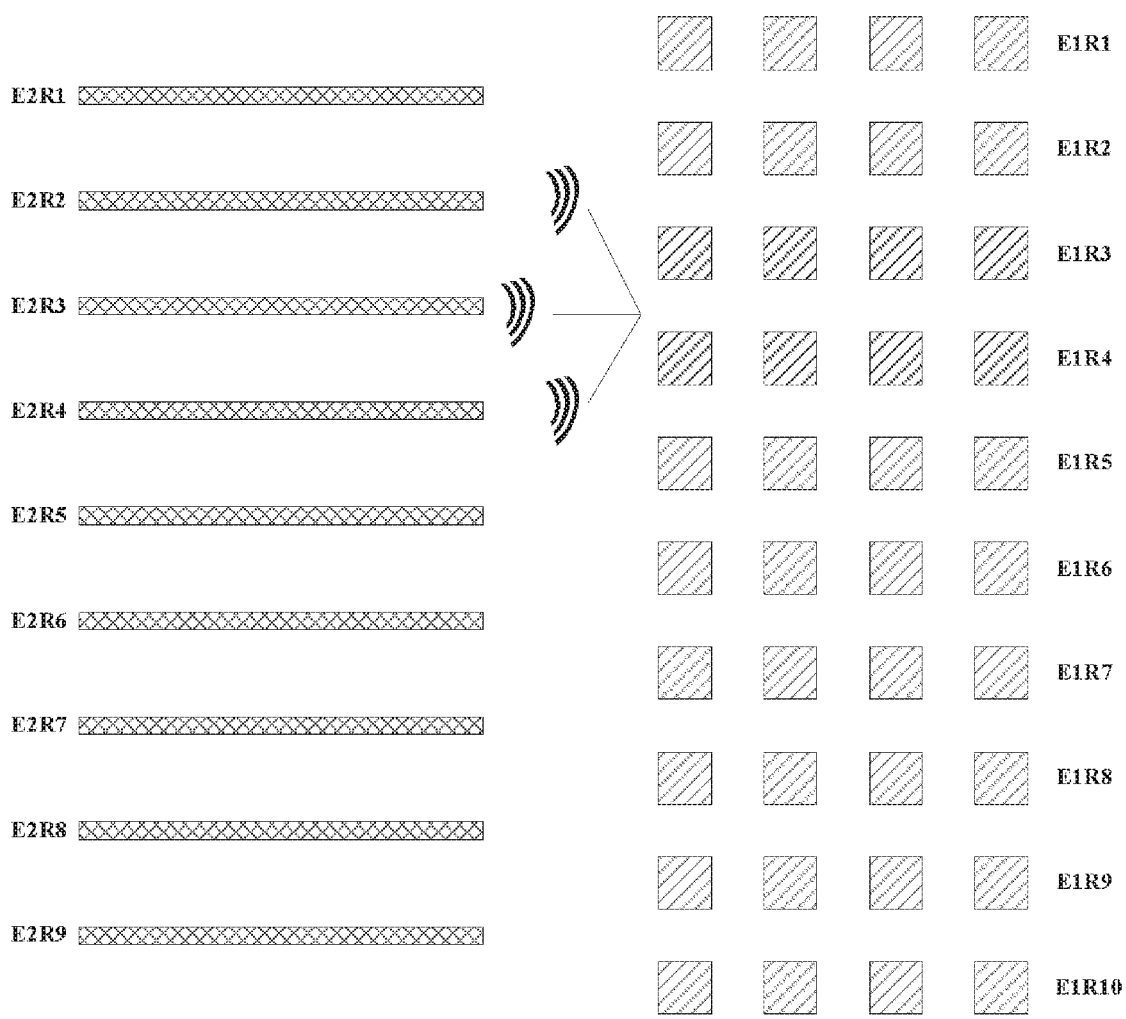
Figure 13C:
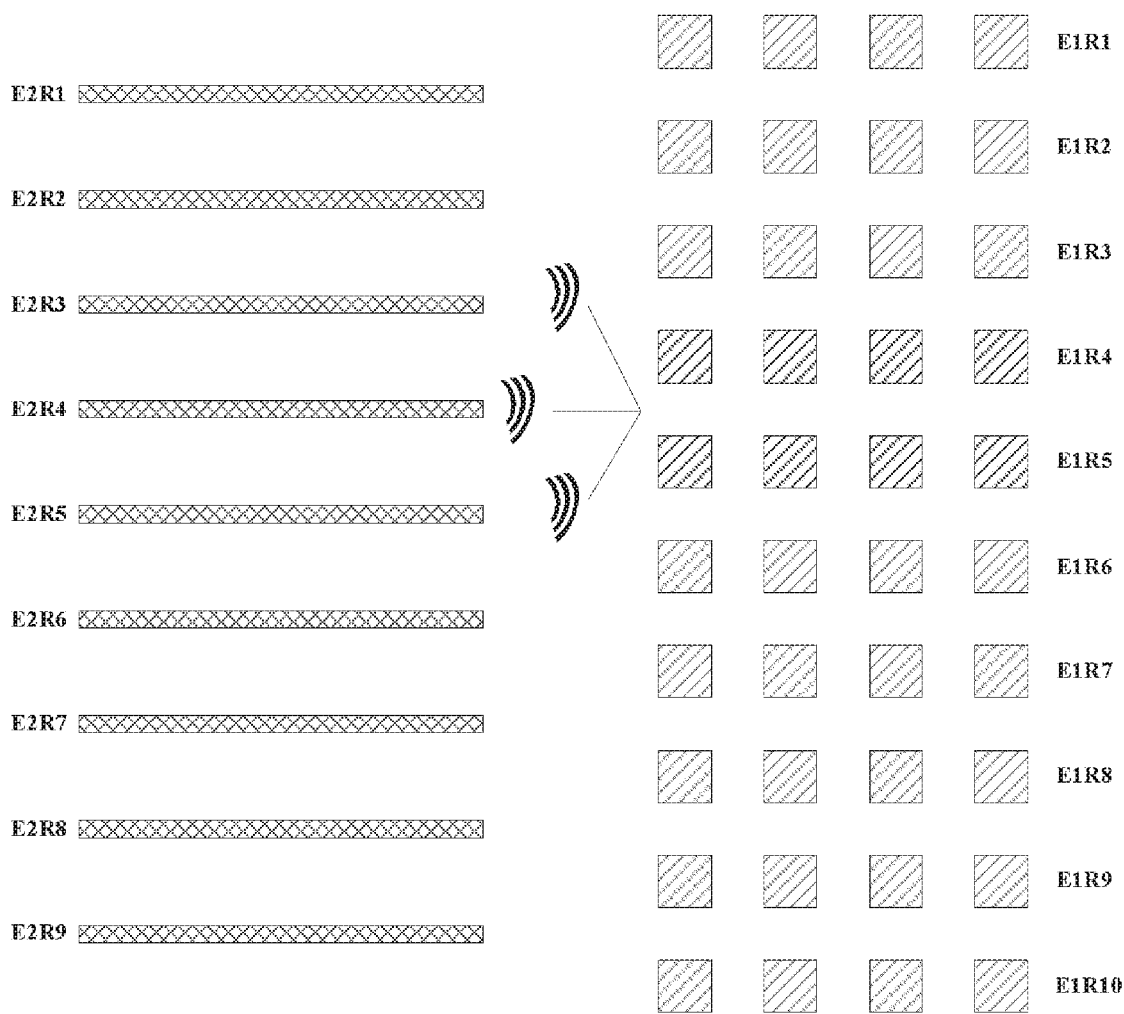

FIGS. 13A to 13C illustrate scanning of a touch interface in an ultrasonic fingerprint sensor apparatus in some embodiments according to the present disclosure. Referring to FIG. 13A, at a first period, three scanning signals are transmitted respectively to three bar electrodes (E2R1, E2R2, and E2R3) of the plurality of rows of second electrodes. Sensing signals are respectively transmitted through two rows (E1R2 and E1R3) of the plurality of rows of first electrodes corresponding to the E2R1, E2R2, and E2R3 of the plurality of rows of second electrodes. Referring to FIG. 13B, at a second period subsequent to the first period, three scanning signals are transmitted respectively to three bar electrodes (E2R2, E2R3, and E2R4) of the plurality of rows of second electrodes. Sensing signals are respectively transmitted through two rows (E1R3 and E1R4) of the plurality of rows of first electrodes corresponding to the E2R2, E2R3, and E2R4 of the plurality of rows of second electrodes. Referring to FIG. 13C, at a third period subsequent to the second period, three scanning signals are transmitted respectively to three bar electrodes (E2R3, E2R4, and E2R5) of the plurality of rows of second electrodes. Sensing signals are respectively transmitted through two rows (E1R4 and E1R5) of the plurality of rows of first electrodes corresponding to the E2R3, E2R4, and E2R5 of the plurality of rows of second electrodes. The process may be performed to scan through an entirety of the touch interface, and the fingerprint sensing integrated circuit generates fingerprint information based on sensing signals transmitted to the fingerprint sensing integrated circuit through the plurality of rows of first electrodes at different periods. Other scanning schemes may be implemented. In one example, two beamforming patterns may be formed to scan the touch interface from two opposite sides. In another example, the beamforming pattern may be formed using more than three (e.g., 4, 5, or 6) bar electrodes. In another example, the plurality of rows of first electrodes are configured to transmit sensing signals time-sequentially. In another example, every other row of the plurality of rows of first electrodes are configured to transmit sensing signals.

In some embodiments, the method further includes providing a first reference electrode layer between the base substrate and the piezoelectric layer; and transmitting a first reference voltage to the first reference electrode layer. Optionally, the first reference electrode layer is in the inter-electrode region and spaced apart from the plurality of first electrodes. Optionally, an orthographic projection of the first reference electrode layer on the base substrate at least partially overlaps with an orthographic projection of a respective one of the one or more second electrodes on the base substrate.

In some embodiments, the method further includes providing a second reference electrode layer; and transmitting a second reference voltage to the second reference electrode layer. Optionally, an orthographic projection of the second reference electrode layer on the base substrate at least partially overlaps with an orthographic projection of a respective one of the plurality of first electrodes on the base substrate. Optionally, the step of providing the second reference electrode layer includes providing a plurality of second reference electrodes. Optionally, an orthographic projection of a respective one of the plurality of second reference electrodes on the base substrate at least partially overlaps with an orthographic projection of a respective one of the plurality of first electrodes on the base substrate.

In another aspect, the present disclosure further provides a method of fabricating an ultrasonic fingerprint sensor apparatus. In some embodiments, the method includes forming a first electrode layer on a base substrate, wherein forming the first electrode layer includes forming an array of a plurality of first electrodes spaced apart from each other by an inter-electrode region; forming a piezoelectric layer on a side of the first electrode layer away from the base substrate; forming a second electrode layer on a side of the piezoelectric layer away from the base substrate, wherein forming the second electrode layer includes forming one or more second electrodes; and forming a first reference electrode layer configured to provide a first reference voltage. Optionally, an orthographic projection of the first electrode layer on the base substrate is substantially non-overlapping with an orthographic projection of the second electrode layer on the base substrate. Optionally, the first electrode layer and the first reference electrode layer are formed between the base substrate and the piezoelectric layer.

In some embodiments, forming a respective one of the one or more second electrodes includes forming a first conductive sub-layer in direct contact with the piezoelectric layer and forming a second conductive sub-layer on a side of the first conductive sub-layer away from the piezoelectric layer.

In some embodiments, the method further includes forming an insulating barrier layer on a side of the piezoelectric layer away from the base substrate. Optionally, the step of forming the insulating barrier layer includes forming a plurality of barrier blocks. Optionally, an orthographic projection of a respective one of the plurality of barrier blocks on the base substrate is substantially non-overlapping with the orthographic projection of the second electrode layer on the base substrate. Optionally, an orthographic projection of a respective one of the plurality of barrier blocks on the base substrate at least partially overlaps with an orthographic projection of a respective one of the plurality of first electrodes on the base substrate. Optionally, forming the insulating barrier layer is performed subsequent to forming the first conductive sub-layer and prior to forming the second conductive sub-layer. Optionally, electroplating the electrode material on the first conductive sub-layer is performed using the plurality of barrier blocks as a mask plate.

In some embodiments, the method further includes forming a first reference electrode layer between the base substrate and the piezoelectric layer. Optionally, the first reference electrode layer is formed in the inter-electrode region and spaced apart from the plurality of first electrodes. Optionally, an orthographic projection of the first reference electrode layer on the base substrate at least partially overlaps with an orthographic projection of a respective one of the one or more second electrodes on the base substrate.

In some embodiments, the method further includes forming a second reference electrode layer including a plurality of second reference electrodes. Optionally, an orthographic projection of a respective one of the plurality of second reference electrodes on the base substrate at least partially overlaps with an orthographic projection of a respective one of the plurality of first electrodes on the base substrate. Optionally, the first conductive sub-layer and the plurality of second reference electrodes are in a same layer and comprise a same conductive material.

Figure 14I:
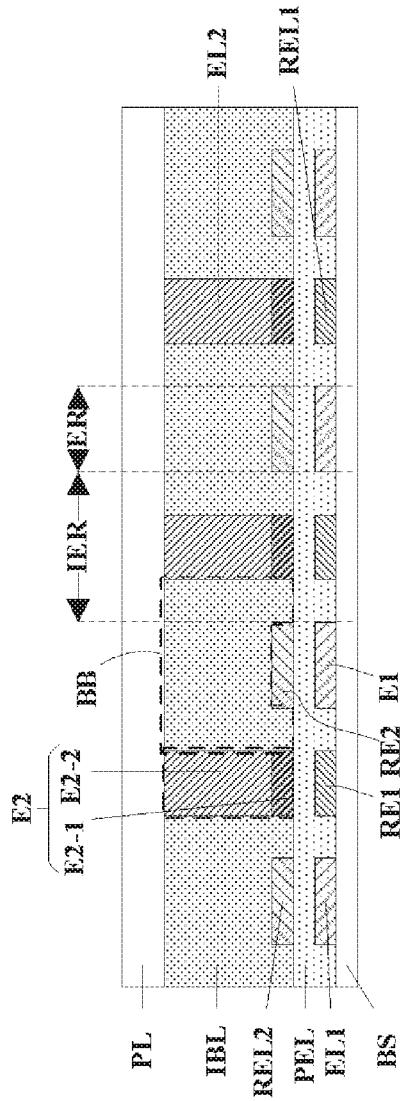

FIGS. 14A to 14I illustrate a method of fabricating an ultrasonic fingerprint sensor apparatus in some embodiments according to the present disclosure. Referring to FIG. 14A, a first conductive material layer CL1 is formed on a base substrate BS. Various appropriate electrode materials and various appropriate fabricating methods may be used to make the first conductive material layer CL1. For example, a conductive metal material may be deposited on the substrate by magnetron sputtering, vapor deposition (e.g., plasma-enhanced chemical vapor deposition), or vacuum deposition. Examples of appropriate conductive metal materials for making the first conductive material layer CL1 include, but are not limited to, copper, titanium, tantalum, aluminum, molybdenum, chromium, and various alloys or laminates thereof.

Referring to FIG. 14B, the first conductive material layer CL1 is patterned to form a first electrode layer EL1 and a first reference electrode layer REL1 in a same patterning process. The first electrode layer EL1 is formed to include a plurality of first electrode E1 respectively in a plurality of electrode regions ER. The first reference electrode layer REL1 is formed to include one or more first reference electrodes RE1 in an inter-electrode region IER. Optionally, the first electrode layer EL1 and the first reference electrode layer REL1 are formed to have a substantially same thickness.

Referring to FIG. 14C, a piezoelectric layer PEL is formed on a side of the first electrode layer EL1 and the first reference electrode layer REL1 away from the base substrate BS. The piezoelectric layer PEL is formed to cover the first electrode layer EL1 and the first reference electrode layer RE1. Various appropriate piezoelectric materials may be used for making the piezoelectric layer PEL. Examples of appropriate piezoelectric materials for making the piezoelectric layer PEL include polyvinylidene fluoride or lead zirconate titanate piezoelectric ceramic.

Referring to FIG. 14D, a second conductive material layer CL2 is formed on a side of the piezoelectric layer PEL away from the base substrate BS. Various appropriate electrode materials and various appropriate fabricating methods may be used to make the second conductive material layer CL2. For example, a conductive metal material may be deposited on the substrate by magnetron sputtering, vapor deposition (e.g., plasma-enhanced chemical vapor deposition), or vacuum deposition. Examples of appropriate conductive metal materials for making the second conductive material layer CL2 include, but are not limited to, copper, titanium, tantalum, aluminum, molybdenum, chromium, and various alloys or laminates thereof. In one example, the second conductive material layer CL2 is made of copper.

Referring to FIG. 14E, the second conductive material layer CL2 is patterned to form a first conductive sub-layer E2-1 of a second electrode layer, and a second reference electrode layer REL2. The second reference electrode layer REL2 is formed to include a plurality of second reference electrodes RE2 respectively in the plurality of electrode regions ER. The first conductive sub-layer E2-1 is formed to include one or more conductive blocks limited in the inter-electrode region IER.

Referring to FIG. 14F, an insulating barrier material layer IBML is formed on a side of the first conductive sub-layer E2-1 and the second reference electrode layer REL2 away from the base substrate BS. Various appropriate materials and various appropriate fabricating methods may be used to make the insulating barrier material layer IBML. For example, the insulating barrier material layer IBML may be formed by a deposition method, e.g., using a plasma-enhanced chemical vapor deposition (PECVD) process. Examples of appropriate materials for making the insulating barrier material layer IBML include, but are not limited to, inorganic insulating materials and organic insulating materials. Examples of appropriate inorganic insulating materials include, but are not limited to, silicon oxide, silicon nitride (e.g., Si3N4), silicon oxynitride (SiOxNy). Examples of appropriate organic insulating materials include, but are not limited to, resins, polyimide, etc. In one example, the insulating barrier material layer IBML is made of a resin material.

Referring to FIG. 14G, the insulating barrier material layer IBML is patterned to form an insulating barrier layer IBL. The insulating barrier layer IBL is formed to include a plurality of insulating barrier blocks BB spaced apart from each other by a groove G. The groove G is in a region corresponding to the first conductive sub-layer E2-1.

Referring to FIG. 14H, a second conductive sub-layer E2-2 is formed in the groove G. In one example, the second conductive sub-layer E2-2 is formed by electroplating a conductive material on top of the first conductive sub-layer E2-1. Various appropriate electrode materials and various appropriate fabricating methods may be used to make the second conductive sub-layer E2-2. For example, a conductive metal material may be deposited on the substrate by electroplating, magnetron sputtering, vapor deposition (e.g., plasma-enhanced chemical vapor deposition), or vacuum deposition. Examples of appropriate conductive metal materials for making the second conductive sub-layer E2-2 include, but are not limited to, copper, titanium, tantalum, aluminum, molybdenum, chromium, and various alloys or laminates thereof. In one example, the second conductive sub-layer E2-2 is made of copper. Optionally, the second conductive sub-layer E2-2 has a thickness in a range of 1 µm to 20 µm. Optionally, the first conductive sub-layer E2-1 has a thickness no more than 1 µm, e.g., 0.5 µm.

Referring to FIG. 14I, a protective layer PL is formed on a side of the insulating barrier layer IBL and the second conductive sub-layer E2-2 away from the base substrate BS. Various appropriate insulating materials and various appropriate fabricating methods may be used to make the protective layer PL. In one example, the protective layer PL is made of an epoxy polymer material.

In another aspect, the present disclosure further provides a display device including the ultrasonic fingerprint sensor apparatus described herein or fabricated by a method described herein. Optionally, the display device further includes a plurality of thin film transistors on a side of the base substrate away from the first electrode layer. Optionally, the display device further includes one or more integrated circuits connected to a display panel of the display device.

Figure 15:
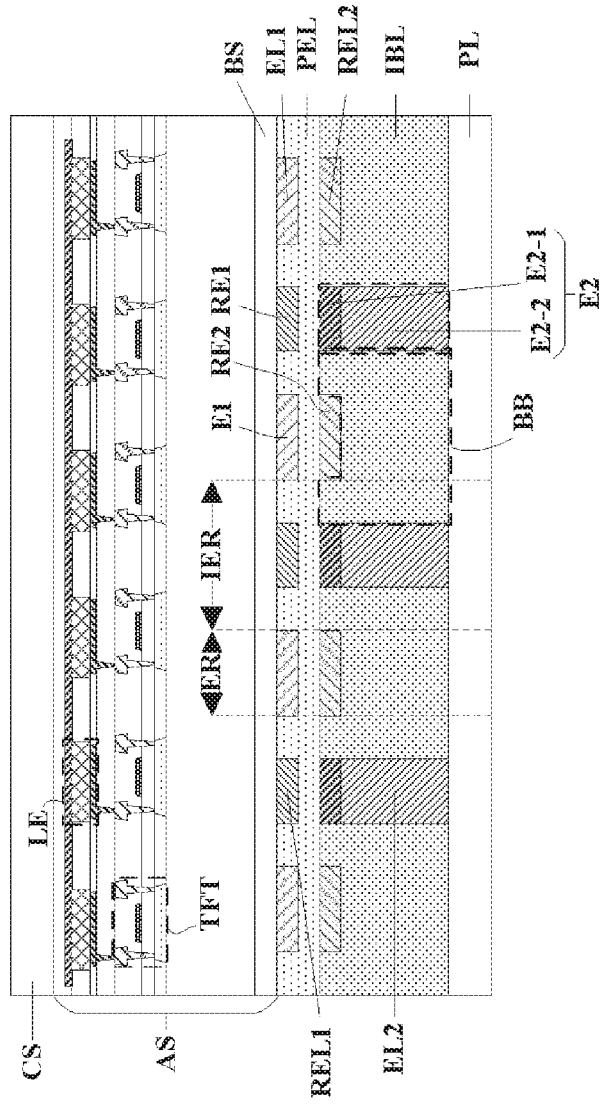
FIG. 15 is a schematic diagram of a display device having an ultrasonic fingerprint sensor apparatus in some embodiments according to the present disclosure.

FIG. 15 is a schematic diagram of a display device having an ultrasonic fingerprint sensor apparatus in some embodiments according to the present disclosure. Referring to FIG. 15, the ultrasonic fingerprint sensor apparatus is formed on a base substrate of an array substrate AS. The array substrate further includes a plurality of thin film transistors TFT and a plurality of light emitting elements LE. The display device further includes a counter substrate CS facing the array substrate AS, and optionally is on a side of the array substrate AS away from the ultrasonic fingerprint sensor apparatus.

The foregoing description of the embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present disclosure" or the like does not necessarily limit the claim scope to a specific embodiment, and the reference to exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the disclosure. It should be appreciated that variations may be made in the embodiments described by persons skilled in the art without departing from the scope of the present disclosure as defined by the following claims. Moreover, no element and component in the present disclosure is intended to be dedicated to the public regardless of whether the element or component is explicitly recited in the following claims.

What is claimed is:

1. An ultrasonic fingerprint sensor apparatus, comprising:
a base substrate;
a first electrode layer on the base substrate, and comprising an array of a plurality of first electrodes spaced apart from each other by an inter-electrode region;
a piezoelectric layer on a side of the first electrode layer away from the base substrate;
a second electrode layer on a side of the piezoelectric layer away from the base substrate, and comprising one or more second electrodes; and
a first reference electrode layer configured to provide a first reference voltage; and
an insulating barrier layer on a side of the piezoelectric layer away from the base substrate;
wherein an orthographic projection of the first electrode layer on the base substrate is substantially non-overlapping with an orthographic projection of the second electrode layer on the base substrate;
the first electrode layer and the first reference electrode layer are between the base substrate and the piezoelectric layer;
the insulating barrier layer comprises a plurality of barrier blocks;
an orthographic projection of a respective one of the plurality of barrier blocks on the base substrate is substantially non-overlapping with the orthographic projection of the second electrode layer on the base substrate; and
an orthographic projection of a respective one of the plurality of barrier blocks on the base substrate at least partially overlaps with an orthographic projection of a respective one of the plurality of first electrodes on the base substrate.

2. The ultrasonic fingerprint sensor apparatus of claim 1, wherein the second electrode layer and the insulating barrier layer are both in direct contact with the piezoelectric layer.

3. The ultrasonic fingerprint sensor apparatus of claim 1, wherein the first reference electrode layer is in the inter-electrode region and spaced apart from the plurality of first electrodes; and
an orthographic projection of the first reference electrode layer on the base substrate at least partially overlaps with an orthographic projection of a respective one of the one or more second electrodes on the base substrate.

4. The ultrasonic fingerprint sensor apparatus of claim 1, wherein the first reference electrode layer and the first electrode layer are both in direct contact with the piezoelectric layer.

5. The ultrasonic fingerprint sensor apparatus of claim 1, further comprising a second reference electrode layer configured to provide a second reference voltage;
wherein an orthographic projection of the second reference electrode layer on the base substrate at least partially overlaps with an orthographic projection of a respective one of the plurality of first electrodes on the base substrate.

6. The ultrasonic fingerprint sensor apparatus of claim 5, wherein the second reference electrode layer comprises a plurality of second reference electrodes;
an orthographic projection of a respective one of the plurality of second reference electrodes on the base substrate at least partially overlaps with an orthographic projection of a respective one of the plurality of first electrodes on the base substrate.

7. The ultrasonic fingerprint sensor apparatus of claim 6, further comprising an insulating barrier layer on a side of the piezoelectric layer away from the base substrate;
wherein the insulating barrier layer comprises a plurality of barrier blocks;
an orthographic projection of a respective one of the plurality of barrier blocks on the base substrate is substantially non-overlapping with the orthographic projection of the second electrode layer on the base substrate; and
the orthographic projection of the respective one of the plurality of barrier blocks on the base substrate at least partially overlaps with an orthographic projection of a respective one of the plurality of first electrodes on the base substrate, and covers the orthographic projection of a respective one of the plurality of second reference electrodes on the base substrate.

8. The ultrasonic fingerprint sensor apparatus of claim 7, wherein a respective one of the one or more second electrodes comprises a first conductive sub-layer in direct contact with the piezoelectric layer and a second conductive sub-layer on a side of the first conductive sub-layer away from the piezoelectric layer;
the first conductive sub-layer and the plurality of second reference electrodes are in a same layer and comprise a same conductive material;
the first conductive sub-layer and the plurality of second reference electrodes have a substantially same thickness along thickness direction from the base substrate to the second electrode layer;
the first conductive sub-layer and the plurality of second reference electrodes are in direct contact with the piezoelectric layer; and
the respective one of the plurality of barrier blocks spaces apart the respective one of the plurality of second reference electrodes from the one or more second electrodes.

9. The ultrasonic fingerprint sensor apparatus of claim 5, wherein the second reference electrode layer is on a side of the second electrode layer away from the base substrate; and the ultrasonic fingerprint sensor apparatus further comprises an insulating layer between the second electrode layer and the second reference electrode layer.

10. The ultrasonic fingerprint sensor apparatus of claim 1, wherein a respective one of the one or more second electrodes comprises a first conductive sub-layer in direct contact with the piezoelectric layer and a second conductive sub-layer on a side of the first conductive sub-layer away from the piezoelectric layer; and the second conductive sub-layer has a thickness greater than a thickness of the first conductive sub-layer along a thickness direction from the base substrate to the second electrode layer.

11. The ultrasonic fingerprint sensor apparatus of claim 1, wherein the second electrode layer comprises a single electrode;

the single electrode comprises a plurality of rows and a plurality of columns intersecting with each other and being interconnected to each other.

12. The ultrasonic fingerprint sensor apparatus of claim 1, wherein the array of the plurality of first electrodes comprises a plurality of rows of first electrodes and a plurality of columns of first electrodes;

the one or more second electrodes comprise a plurality of rows of second electrodes; and a respective row of the plurality of rows of second electrodes comprises a bar electrode crossing over the plurality of columns of first electrodes.

13. A display apparatus, comprising:

the ultrasonic fingerprint sensor apparatus of claim 1; and a plurality of thin film transistors on a side of the base substrate away from the first electrode layer.

14. A method of detecting fingerprint information, comprising:

providing a first electrode layer on a base substrate, wherein the first electrode layer comprises an array of a plurality of first electrodes spaced apart from each other by an inter-electrode region;

providing a piezoelectric layer on a side of the first electrode layer away from the base substrate;

providing a second electrode layer on a side of the piezoelectric layer away from the base substrate, wherein the second electrode layer comprises one or more second electrodes; an orthographic projection of the plurality of first electrodes on the base substrate is substantially non-overlapping with an orthographic projection of the second electrode layer on the base substrate;

transmitting a scanning signal to a respective one of the one or more second electrodes to generate an ultrasonic signal by the piezoelectric layer;

converting a reflected ultrasonic signal by the piezoelectric layer into a sensing signal; and transmitting the sensing signal through a respective one of the plurality of first electrodes to a fingerprint sensing integrated circuit;

wherein the one or more second electrodes comprise a plurality of second electrodes, and transmitting the scanning signal to the respective one of the one or more second electrodes to generate the ultrasonic signal by the piezoelectric layer comprises transmitting at least two scanning signals respectively to at least two second electrodes of the plurality of second electrodes to generate at least two ultrasonic signals according to a beamforming pattern;

wherein the beamforming pattern focuses the at least two ultrasonic signals to a location at a touch interface; and at least one of the at least two ultrasonic signals is phase delayed with respect to at least another of the at least two ultrasonic signals.

15. The method of claim 14, wherein the array of the plurality of first electrodes comprises a plurality of rows of first electrodes and a plurality of columns of first electrodes;

the one or more second electrodes comprises a plurality of rows of second electrodes; and a respective row of the plurality of rows of second electrodes comprises a bar electrode crossing over the plurality of columns of first electrodes;

wherein transmitting at least two scanning signals respectively to at least two second electrodes of the plurality of second electrodes to generate at least two ultrasonic signals according to a beamforming pattern comprises transmitting at least two scanning signals respectively to at least two bar electrodes of the plurality of rows of second electrodes, wherein the at least two bar electrodes respectively cross over the plurality of columns of first electrodes; and transmitting the sensing signal through the respective one of the plurality of first electrodes to the fingerprint sensing integrated circuit comprises transmitting the sensing signal to the fingerprint sensing integrated circuit through at least one row of the plurality of rows of first electrodes corresponding to at least one of the at least two bar electrodes.

16. The method of claim 14, further comprising:

providing a first reference electrode layer between the base substrate and the piezoelectric layer; and transmitting a first reference voltage to the first reference electrode layer;

wherein the first reference electrode layer is in the inter-electrode region and spaced apart from the plurality of first electrodes; and an orthographic projection of the first reference electrode layer on the base substrate at least partially overlaps with an orthographic projection of a respective one of the one or more second electrodes on the base substrate.

17. The method of claim 15, further comprising:

providing a second reference electrode layer; and transmitting a second reference voltage to the second reference electrode layer;

wherein an orthographic projection of the second reference electrode layer on the base substrate at least partially overlaps with an orthographic projection of a respective one of the plurality of first electrodes on the base substrate.

18. A method of fabricating an ultrasonic fingerprint sensor apparatus, comprising:

forming a first electrode layer on a base substrate, wherein forming the first electrode layer comprises forming an array of a plurality of first electrodes spaced apart from each other by an inter-electrode region;

forming a piezoelectric layer on a side of the first electrode layer away from the base substrate;

forming a second electrode layer on a side of the piezoelectric layer away from the base substrate, wherein forming the second electrode layer comprises forming one or more second electrodes;

forming a first reference electrode layer configured to provide a first reference voltage; and forming an insulating barrier layer on a side of the piezoelectric layer away from the base substrate;

wherein an orthographic projection of the first electrode layer on the base substrate is substantially non-overlapping with an orthographic projection of the second electrode layer on the base substrate;

the first electrode layer and the first reference electrode layer are formed between the base substrate and the piezoelectric layer the insulating barrier layer comprises a plurality of barrier blocks;

an orthographic projection of a respective one of the plurality of barrier blocks on the base substrate is substantially non-overlapping with the orthographic projection of the second electrode layer on the base substrate; and an orthographic projection of a respective one of the plurality of barrier blocks on the base substrate at least partially overlaps with an orthographic projection of a respective one of the plurality of first electrodes on the base substrate.

\* \* \* \* \*